(12) United States Patent
Ujiie et al.

(10) Patent No.: US 12,163,197 B2
(45) Date of Patent: Dec. 10, 2024

(54) METHOD OF MANUFACTURING LEATHER

(71) Applicants: MIDORI AUTO LEATHER CO., LTD., Yamagata (JP); TOYOTA JIDOSHA KABUSHIKI KAISHA, Toyota (JP)

(72) Inventors: Tatsuaki Ujiie, Yamagata (JP); Yasumitsu Suzuki, Yamagata (JP); Haruki Oura, Yamagata (JP); Seiji Yamaguchi, Yamagata (JP); Yoshio Yamada, Toyota (JP)

(73) Assignees: MIDORI AUTO LEATHER CO. LTD., Yamagata (JP); TOYOTA JIDOSBA KABUSHIKI KAISHA., Aicht. (JP)

(*) Notice: Subject to any disclaimer, the term of this patent is extended or adjusted under 35 U.S.C. 154(b) by 568 days.

(21) Appl. No.: 17/621,704

(22) PCT Filed: Dec. 24, 2020

(86) PCT No.: PCT/JP2020/048384
§ 371 (c)(1),
(2) Date: Dec. 22, 2021

(87) PCT Pub. No.: WO2021/145188
PCT Pub. Date: Jul. 22, 2021

(65) Prior Publication Data
US 2022/0243292 A1    Aug. 4, 2022

(30) Foreign Application Priority Data
Jan. 14, 2020    (JP) .................. 2020-003890

(51) Int. Cl.
| | | |
|---|---|---|
| *C14C 3/28* | (2006.01) |
| *C14C 3/14* | (2006.01) |
| *C14C 3/16* | (2006.01) |
| *C14C 3/20* | (2006.01) |
| *C14C 3/22* | (2006.01) |
| *C14C 99/00* | (2006.01) |

(52) U.S. Cl.
CPC .................. *C14C 3/28* (2013.01); *C14C 3/14* (2013.01); *C14C 3/16* (2013.01); *C14C 3/20* (2013.01); *C14C 3/22* (2013.01); *C14C 99/00* (2013.01)

(58) Field of Classification Search
CPC .... C14C 3/14; C14C 3/16; C14C 3/20; C14C 3/22; C14C 3/28; C14C 99/00
See application file for complete search history.

(56) References Cited

FOREIGN PATENT DOCUMENTS

| | | | | |
|---|---|---|---|---|
| JP | 2009007480 A | * | 1/2009 | ............... C14C 3/04 |
| JP | 2010-121012 A | | 6/2010 | |
| JP | 2010-144061 A | | 7/2010 | |

* cited by examiner

*Primary Examiner* — Amina S Khan
(74) *Attorney, Agent, or Firm* — SOLARIS Intellectual Property Group, PLLC

(57) ABSTRACT

The present invention provides a method of manufacturing leather, which not only significantly suppresses the occurrence of adhesive wrinkling and boarding/alighting wrinkling when used for an automobile seat, for example, but also exhibits appropriate flexibility.

The present invention is a method of manufacturing leather including a pretreatment step, a tanning step, a retanning step, and a drying and finishing step in this order, the retanning process including, in the following order, subjecting a shaving leather obtained from the tanning process to a stage of performing treatment using a predetermined retanning agent and a predetermined resin, a stage of performing treatment using a predetermined retanning agent, a predetermined resin, and a predetermined fatliquoring agent, and a stage of performing treatment using a predetermined resin and a predetermined fatliquoring agent, and the drying in the drying and finishing process including, in the following order, subjecting a leather obtained from the retanning process to a stage of drying under reduced pressure under predetermined conditions and a step of drying at atmospheric pressure under predetermined conditions.

16 Claims, 13 Drawing Sheets

FIG. 7III
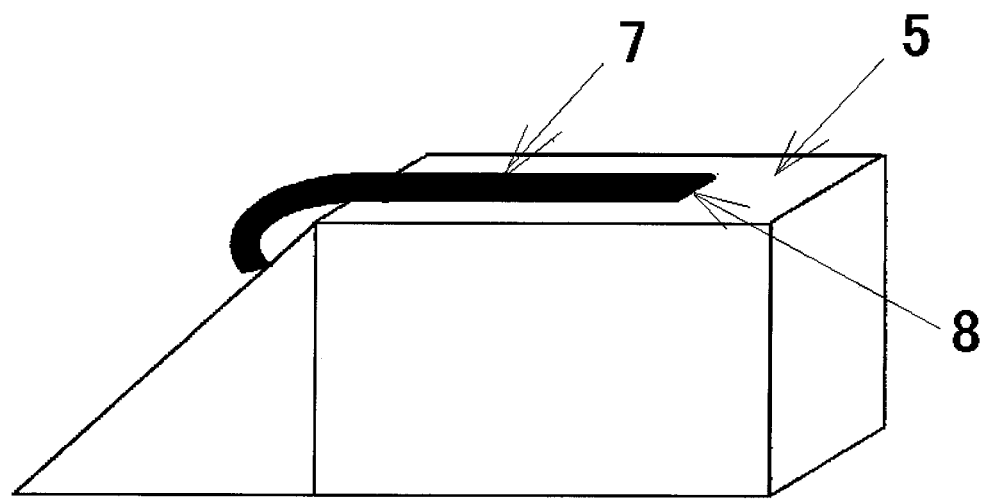

METHOD OF MANUFACTURING LEATHER

TECHNICAL FIELD

The present invention relates to a method of manufacturing leather, and more specifically, relates to a method of manufacturing leather including, in order, a pretreatment process, a tanning process, a retanning process, and a drying/finishing process.

RELATED ART

Leather is widely used as a natural skin material, across a wide range of products from those that are directly attached to the body such as shoes, bags, and clothing, to furniture, decorative items, sports equipment, and even industrial applications, and is often used as a covering material for automobile interior components such as seats, instrument panels, and door panels. The quality required for leather varies depending on the application, and for leather used for automobile seats, in order to adapt to a harsh usage environment exemplified by wide temperature ranges, direct sunlight, and repeated boarding and alighting, durability as exemplified by a high level of wear resistance, light resistance, and creasing resistance has been required before anything else. In recent years, in addition to these, various improvements have been made, such as leather with a luxurious aspect in terms, for example, of flexibility and favorable tactile sensation, leather that does not easily get dirty, and leather that inhibits volatile substances. Further, excellent appearance is also an important quality required for leather; however, recently, in conjunction with the increasing complexity of seat shapes, wrinkling has been observed, particularly at portions at which the front side of the leather is curved so as to be recessed (concave curved portion), and suppression thereof is required. It was thought that the reason for this was that the cushioning material was attached to the rear surface of the leather parts by adhesion instead of stitching.

Wrinkling on leather automobile seats may occur owing to friction caused by repeated boarding and alighting by passengers, particularly at the protruding portions (bolster parts) at both sides of the seat surface and the rear surface, and, as leather with reduced wrinkling, a leather has been proposed, for example, in which a synthetic retanning agent and a resin used in the retanning process are optimized, and further, an aluminum compound is used, thereby enhancing the restorative force for elongation (Patent Document 1). However, the wrinkling that occurs in the concave curved portions is seen immediately after the automobile seat is manufactured, and it seems that the cause of the wrinkling is different from that of wrinkling caused by repeated boarding and alighting, and has not yet been sufficiently improved. In the present invention, what is known as the retanning process consists of two stages: a retanning treatment using a retanning agent configured by a synthetic tanning agent and resin, and, performed after subsequent dyeing, a fatliquoring treatment with a fatliquoring agent.

Further, in leather for automobile instrument panels, a leather has been proposed in which wrinkling generated when a leather is adhered to a base material using a moisture-curable adhesive and the adhesive is then cured in a high humidity environment, is suppressed (Patent Document 2). As means for solution, chrome-free tanning with low thermal shrinkage is used, milling to loosen the leather fibers and soften the leather is omitted, the leather fibers are further compressed by vacuum drying, a preheating process is newly provided, heat shrinkage is effected in advance, and the fibers are densified to the greatest possible extent, thereby suppressing the occurrence of wrinkling. By such means, while wrinkling is suppressed, the leather becomes very hard and is not suitable for automobile seats, which require flexibility. In the present invention, the retanning process consists of two stages: a retanning treatment using a retanning agent configured by a synthetic tanning agent and resin, and, performed after subsequent dyeing, a fatliquoring treatment with a fatliquoring agent.

PRIOR ART DOCUMENTS

Patent Documents

Patent Document 1: Japanese Patent Application Laid-open No. 2010-144061
Patent Document 2: Japanese Patent Application Laid-open No. 2010-121012

SUMMARY OF INVENTION

Technical Problem

The present invention aims to provide a method of manufacturing leather that, when used for an automobile seat, for example, when a cushioning material is adhered to the rear surface of leather and the seat is covered thereby, at the curved surfaces of the seat body, particularly in portions at which the surface is curved so as to be recessed (see the portions surrounded by rectangles in FIG. 11, also referred to as "concave curved portions"), not only is the occurrence of wrinkling caused by bending force (hereinafter, also referred to as "adhesive wrinkling"), and wrinkling that occurs when a person repeatedly boards and alights (hereinafter, also referred to as "boarding/alighting wrinkling") significantly suppressed, but the leather has both the durability required for leather for automobile seats and appropriate flexibility.

Solution to Problem

The present inventors first investigated the causes of the occurrence of wrinkling in the concave curved portions. When using leather as a cover for an automobile seat, cut leather parts are sewn in accordance with the shape of the automobile seat and combined to form a leather trim cover, which then covers a urethane seat body. At this time, before making the leather trim cover, generally, a urethane foam sheet-like cushioning material having a thickness of about 5 to 20 mm is attached to the rear side of the leather parts. Conventionally, the cushioning material has been attached by sewing to the circumference of the leather parts; however, because the leather has sometimes slipped off from the cushioning material causing slackening, instead of sewing, leather and cushioning materials are now more often bonded together with a non-woven hot melt adhesive. While leather is a relatively stretchable material, since cushioning material stretches much less readily than leather, when the cushioning material is adhered to the rear surface of the leather, the leather is restrained by the cushioning material and stretches less readily. In such a state, it was thought that wrinkling probably occurred as a result of the surface of the leather being curved in a recessed aspect. In actuality, when the cross section of the leather was observed, in a wrinkled portion, slippage and/or peeling of the leather had occurred between the reticular dermis (layer of fibrous structure in which thick fiber bundles at the rear side of the leather are loosely entwined) and the papillary dermis (layer of fibrous structure in which fine fibers at the front side of the leather are densely entwined), and it was observed that the papillary dermis was in a swollen state. The cause of slippage and/or peeling was thought to be that if the leather is curved so that the front surface is recessed in a state in which the rear surface is restrained and cannot stretch, the stress that compresses the front surface is applied more strongly than when there is no restraint.

Therefore, it was thought that adhesive wrinkling can be reduced by, together with strengthening the bonding between the leather fibers, reducing the gaps between fibers, stabilizing the fiber structure, reducing distortion due to stress, and suppressing the slippage and/or peeling between the reticular dermis and the papillary dermis, which have different fiber structures, and extensive research has been conducted to this end. Since, conventionally, it has been thought that it is effective to appropriately modify the treatment in the retanning process in order to improve the characteristics of the manufactured leather, first, the present inventors attempted to modify various types of retanning agents and resins used in the retanning process. As a result, with combinations of the predetermined retanning agents and resins described below, it was possible to enhance the effect of suppression of wrinkling (here, when simply "wrinkling" is mentioned, both adhesive wrinkling and boarding/alighting wrinkling are included) to some extent; however, the above-described problems remained far from being successfully solved. Therefore, the present inventors tried variously changing the addition amounts of these predetermined retanning agents and resins, and found that the occurrence of wrinkling could be significantly suppressed by significantly increasing the amount of resin added. However, on the other hand, the finished leather was extremely hard and could not be adapted to use in automobile seats, for example. Here, the fatliquoring treatment carried out as part of the retanning process is performed to impart the leather with flexibility, and therefore, when hard leather was obtained in this way, it was thought that it would be effective to increase the amount of the fatliquoring agent added. Therefore, when the amount of the fatliquoring agent added was increased, although it had a certain effect in terms of imparting flexibility, the resulting leather remained hard and was unable to eliminate the defect of uncomfortable riding when used in automobile seats, also made seat manufacturing difficult, and of course, could not be adapted to use in automobile seats. After searching to find the cause of this, the present inventors have come to the conclusion that the resin might not be adequately and evenly filled between the fibers configuring the leather. The present inventors conducted further studies, and in order to fill the resin between the fibers that configure the leather to an appropriate amount and evenly, it was thought necessary to appropriately adjust the addition amounts of the predetermined retanning agents, resins and fatliquoring agents described below in relation to each other. Therefore, while increasing the amount of the resin and the fatliquoring agent added, the treatment in the retanning step was divided into several stages as described below, and the predetermined resin and fatliquoring agent described below were added at predetermined amounts, and it was found that by combination with the predetermined retanning agent described below, it was possible to produce leather in which wrinkling is less likely to occur and that has appropriate flexibility even if the amount of resin added was increased to a certain extent. Further, the present inventors have continued to further consider how to obtain leather in which the occurrence of wrinkling is further suppressed and which has even more favorable flexibility, to an extent that is sufficiently satisfactory for automobile seats, for example. Further, the leather obtained by retanning treatment as described above is subjected to a subsequent drying process, in which, by combining reduced-pressure drying and atmospheric-pressure drying under the predetermined conditions described below, it is possible to produce leather that not only sufficiently suppresses the occurrence of wrinkling but also has extremely excellent flexibility. This leather has been found to be sufficiently satisfactory for automobile seats. While it is not clear what kind of action the combination of reduced-pressure drying and atmospheric-pressure drying has on leather, it is presumed that the fibers are arranged regularly causing the entire leather to become soft without disturbing the properties of the leather obtained from the retanning process.

That is, the present invention is (1) a method of manufacturing leather, the method including, in the following order: (I) a pretreatment process; (II) a tanning process; (III) a retanning process; and (IV) a drying and finishing process, in which:

(III) the retanning process includes, in the following order, subjecting a shaving leather obtained from (II) the tanning process to:

(III-0) a stage of performing a retanning treatment using: from 14.4 to 21.6 parts by mass of a retanning agent (d) consisting of chromium (d1) and glutaraldehyde (d2), and from 7.0 to 10.6 parts by mass of at least one resin (b) selected from the group consisting of: (b1) a polymer consisting of one selected from the group consisting of acrylic acid, methacrylic acid, acrylic acid ester and methacrylic acid ester, or a mixture of these polymers, (b2) a polymer consisting of two or more selected from the group consisting of acrylic acid, methacrylic acid, acrylic acid ester and methacrylic acid ester, or a mixture of these polymers, and (b3) a polycondensate of melamine and formaldehyde, (III-1) a stage of performing a retanning treatment using from 12.8 to 19.2 parts by mass of a retanning agent (a) consisting of a polycondensate (a1) of aromatic sulfonic acid and formaldehyde, and from 19.7 to 29.5 parts by mass of the resin (b) and, at the same time, performing a fatliquoring treatment using from 3.4 to 5.2 parts by mass of a fatliquoring agent (c) consisting of (c1) a synthetic oil, a natural oil or any combination thereof, and (III-2) a stage of performing a resin tanning treatment using from 5.3 to 7.9 parts by mass of the resin (b) and, at the same time, performing a fatliquoring treatment using from 7.0 to 10.4 parts by mass of the fatliquoring agent (c), wherein an amount of each of the retanning agent (a), the resin (b), the fatliquoring agent (c), and the retanning agent (d) is an amount relative to 100 parts by mass (dry standard) of the shaving leather, and the drying in (IV) the drying and finishing process includes, in the following order, subjecting a leather obtained from (III) the retanning process to:

(IV-1) a stage of drying at reduced pressure at from 35° C. to 45° C. for from 1 to 5 minutes, and (IV-2) a stage of drying at atmospheric pressure at from 35° C. to 45° C. for from 10 to 40 minutes.

Examples of preferred embodiments include:

(2) the method of manufacturing leather described in (1) above, in which (c1) the synthetic oil, natural oil or combination thereof configuring the fatliquoring agent (c) is present as an O/W type emulsion, and a shape of an oil droplet of the fatliquoring agent (c) is a substantially ellipsoidal sphere;

(3) the method of manufacturing leather described in (2) above, in which the number of oil droplets having a substantially ellipsoidal spherical shape in the oil (c1) is 60% or more of the total number of oil droplets;

(4) the method of manufacturing leather described in (2) above, in which the number of oil droplets having a substantially ellipsoidal spherical shape in the oil (c1) is 90% or more of the total number of oil droplets;

(5) the method of manufacturing leather described in any one of (1) to (4) above, in which, in the above-described stage (III-0), the amount of the retanning agent (d) is from 16.0 to 20.0 parts by mass, and the amount of the resin (b) is from 8.0 to 9.5 parts by mass, in the above-described stage (III-1), the amount of the retanning agent (a) is from 14.5 to 17.5 parts by mass, the amount of the resin (b) is from 22.0 to 27.0 parts by mass, and the amount of the fatliquoring agent (c) is from 4.0 to 4.7 parts by mass, and in the above-described stage (III-2), the amount of the resin (b) is from 6.0 to 7.2 parts by mass, and the amount of the fatliquoring agent (c) is from 8.0 to 9.5 parts by mass;

(6) the method of manufacturing leather described in any one of (1) to (5) above, in which the resin (b) used in the above-described stage (III-0) is (b1) a polymer consisting of one selected from the group consisting of acrylic acid, methacrylic acid, acrylic acid ester and methacrylic acid ester, or a mixture of these polymers;

(7) the method of manufacturing leather described in any one of (1) to (6) above, in which the resin (b) used in the above-described stage (III-1) is (b1) a polymer consisting of one selected from the group consisting of acrylic acid, methacrylic acid, acrylic acid ester and methacrylic acid ester, or a mixture of these polymers, (b2) a polymer consisting of two or more selected from the group consisting of acrylic acid, methacrylic acid, acrylic acid ester and methacrylic acid ester, or a mixture of these polymers, and (b3) a polycondensate of melamine and formaldehyde;

(8) the method of manufacturing leather described in any one of (1) to (7) above, in which the resin (b) used in the above-described stage (III-2) is (b1) a polymer consisting of one selected from the group consisting of acrylic acid, methacrylic acid, acrylic acid ester and methacrylic acid ester, or a mixture of these polymers;

(9) the method of manufacturing leather described in any one of (1) to (8) above, in which, in the above-described stage (III-1), in addition to the condensate (a1) of an aromatic sulfonic acid and formaldehyde, the retanning agent (a) further includes from 3.0 to 6.0 parts by mass of a sodium salt (a2) of an aromatic sulfonic acid and an aromatic carboxylic acid;

(10) the method of manufacturing leather described in any one of (1) to (9) above, in which, in the above-described stage (III-2), in addition to (c1) the synthetic oil, natural oil, or combination thereof, the fatliquoring agent (c) further includes from 10.0 to 17.0 parts by mass of a silicone-containing polymer dispersion (c2);

(11) the method of manufacturing leather described in any one of (1) to (10) above, in which the leather obtained from stage (III-1) is subjected to dyeing between the above-described stage (III-1) and the above-described stage (III-2);

(12) the method of manufacturing leather described in any one of (1) to (11) above, in which, in (IV) the drying and finishing process, the leather that has undergone the stage (IV-1) of reduced-pressure drying and the stage (IV-2) of atmospheric pressure drying is subjected to milling;

(13) the method of manufacturing leather described in any one of (1) to (12) above, being for an automobile seat; and

(14) leather obtained by the method of manufacturing leather described in any one of (1) to (13) above.

Advantageous Effects of Invention

According to the method of manufacturing leather of the present invention, leather can be produced in which, when used for automobile seats, for example, not only is the occurrence of adhesion wrinkling and boarding/alighting wrinkling significantly suppressed, but the leather also exhibits appropriate flexibility.

DESCRIPTION OF EMBODIMENTS

Figure 1:
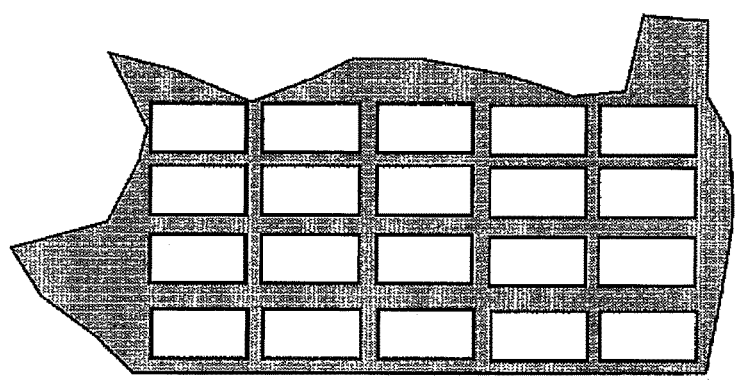
FIG. 1 is a schematic view showing cutting locations for test samples used in an adhesive wrinkling evaluation test.

The method of manufacturing leather of the present invention includes, in order, (I) a pretreatment process, (II) a tanning process, (III) a retanning process, and (IV) a drying and finishing process. Further, in the present invention, (III) the retanning process includes, in order, subjecting a shaving leather obtained from (II) the tanning process to: (III-0) a stage of performing a retanning treatment using a retanning agent (d) consisting of chromium (d1) and glutaraldehyde (d2), and one or more resins (b) selected from the group consisting of (b1) a polymer consisting of one selected from the group consisting of acrylic acid, methacrylic acid, acrylic acid ester and methacrylic acid ester, or a mixture of these polymers, (b2) a polymer consisting of two or more selected from the group consisting of acrylic acid, methacrylic acid, acrylic acid ester and methacrylic acid ester, or a mixture of these polymers, and (b3) a polycondensate of melamine and formaldehyde, (III-1) a stage of performing a retanning treatment using a retanning agent (a) consisting of a condensate (a1) of aromatic sulfonic acid and formaldehyde, and the above-described resin (b), and at the same time, performing a fatliquoring treatment using a fat liquoring agent (c) consisting of (c1) a synthetic oil, a natural oil, or any combination thereof, and (III-2) a stage of performing a resin tanning treatment using the above-described resin (b), and at the same time, performing a fatliquoring treatment using the above-described fat liquoring agent (c), and the drying in (IV) the drying and finishing process includes, in order, subjecting the leather obtained from the above-described (III) retanning process to (IV-1) a stage of reduced-pressure drying and (IV-2) a stage of drying at atmospheric pressure. Here, shaving leather refers to cowhide obtained by shaving off the rear side (flesh surface) of moist leather obtained in (II) the tanning process, and usually, the thickness is approximately constant depending on use applications such as automobile seats and automobile steering wheels, for example, and is preferably adjusted to from 1.0 to 1.2 mm, and the water content is also approximately constant, preferably at from 50 to 60% by mass.

In (III) the retanning process, usually, according to a conventional method, first, the shaving leather is rehydrated, and then, it is washed with water and unbonded tanning agent, excess acid, leather scraps generated and attached during shaving (shaving scraps) and the like are removed. Next, a neutralization treatment is performed prior to the treatment in each stage. When the neutralization treatment is performed in advance, it can be performed together with the above-mentioned water washing. Neutralization treatment refers to an operation of adjusting the pH value to about 5, for example, to about 4.7 to 5.2, because the pH value of shaving leather after tanning is usually about 3 to 4 and the shaving leather contains a large amount of acid. Agents used for neutralization are known, and for example, sodium hydrogen carbonate (baking soda), sodium formate, sodium acetate, ammonium bicarbonate and the like are used. The neutralization treatment is carried out under conditions that are commonly and widely used, and is usually carried out at a temperature of 35 to 45° C. for about 2 to 3 hours. Leather that has been subjected to neutralization treatment in this way is usually washed with water according to a conventional method and then subjected to the subsequent processes.

In the above-described stage (III-0), the shaving leather obtained from (II) the tanning process is subjected to a retanning treatment using a retanning agent (d) consisting of chromium (d1) and glutaraldehyde (d2), and one or more resins (b) selected from the group consisting of (b1) a polymer consisting of one selected from the group consisting of acrylic acid, methacrylic acid, acrylic acid ester and methacrylic acid ester, or a mixture of these polymers, (b2) a polymer consisting of two or more selected from the group consisting of acrylic acid, methacrylic acid, acrylic acid ester and methacrylic acid ester, or a mixture of these polymers, and (b3) a polycondensate of melamine and formaldehyde. The retanning treatment can be carried out after the leather has been neutralized in advance as described above. Alternatively, it can be carried out together with the leather neutralization treatment.

The chromium (d1) and glutaraldehyde (d2) used in the retanning treatment are known, and substances that are usually used as tanning agents can be used. As the chromium (d1), a trivalent chromium complex (basic chromium sulfate tanning agent) is preferably used. Here, the retanning agent (d) is used in an amount of 14.4 to 21.6 parts by mass with respect to 100 parts by mass (dry standard) of shaving leather, preferably 16.0 to 20.0 parts by mass, and more preferably, 17.0 to 19.0 parts by mass. If the amount of the retanning agent (d) exceeds the above-described upper limit, hardness may increase and texture may be impaired, and if it is less than the above-described lower limit, the wrinkling suppression effect may be insufficient. In addition, the amount of each of the above-described retanning agents (d1) and (d2) is not particularly limited as long as the total amount is within the range of the amount of the retanning agent (d). Here, with respect to 100 parts by mass of shaving leather (dry standard), the chromium (d1) is preferably 7.2 to 10.8 parts by mass, more preferably 8.0 to 10.0 parts by mass, and yet more preferably 8.5 to 9.5 parts by mass, and the glutaraldehyde (d2) is preferably 7.2 to 10.8 parts by mass, more preferably 8.0 to 10.0 parts by mass, and yet more preferably 8.5 to 9.5 parts by mass. In the above-described re-tanning process, by using chromium (d1) and glutaraldehyde (d2), which are usually used as tanning agents in (II) the tanning process, and have strong cross-linking power, as re-tanning agents, not only can slippage and/or peeling that occurs between the reticular dermis and the papillary dermis of leather be suppressed by cross-linking the leather fibers together and suppressing distortion of the fiber structure due to stress, but, preferably, by usage in the above-described amounts, elasticity and resilience between the leather fibers can be further enhanced. Here, since chromium reacts with the carboxy group of collagen configuring the leather fiber, and glutaraldehyde reacts with the amino group, the two have different cross-linking points. Therefore, it is thought that the cross-linking effect is enhanced by combined use.

Further, as the resin (b), one or more selected from the group consisting of (b1) a polymer consisting of one selected from the group consisting of acrylic acid, methacrylic acid, acrylic acid ester and methacrylic acid ester, or a mixture of these polymers, (b2) a polymer consisting of two or more selected from the group consisting of acrylic acid, methacrylic acid, acrylic acid ester and methacrylic acid ester, or a mixture of these polymers, and (b3) a polycondensate of melamine and formaldehyde, is used. A polymer consisting of one selected from the group consisting of the acrylic acid, methacrylic acid, acrylic acid ester and methacrylic acid ester configuring the above-described resin (b1) is a polymer (homogeneous polymer) obtained by polymerizing these respective monomers independently, and a mixture of these polymers is a mixture of two or more of these independently polymerized polymers. Further, a polymer consisting of two or more selected from the group consisting of the acrylic acid, methacrylic acid, acrylic acid ester and methacrylic acid ester configuring the above-described resin (b2) is a polymer (copolymer) obtained by polymerizing two or more of these monomers, and preferably, is a polymer obtained by polymerizing two kinds of these monomers. A mixture of these polymers is a mixture of two or more kinds of these polymers each consisting of two or more kinds. Further, the polymer obtained by polymerizing two or more kinds includes a graft polymer of these polymers. The weight average molecular weights of the above-described polymer (b1) and polymer (b2) are both preferably 1,000 to 250,000, and more preferably 1,000 to 100,000. As these, known polymers can be used. As the polycondensate (b3) of melamine and formaldehyde described above, known polycondensates can be used. For example, a polycondensate of melamine and formaldehyde partially etherified with glycol ether and/or alkyl glycol ether (Japanese Patent Laid-Open No. 63-89599), or a resin mixture consisting of a melamine-formaldehyde resin and an anion-modified melamine-formaldehyde resin (Japanese Patent Laid-Open No. 63-89600) can also be used. The weight-average molecular weight of the polycondensate (b3) of melamine and formaldehyde is preferably 1,000 to 100,000, and more preferably 1,000 to 50,000. In the method of manufacturing leather in the present invention, addition of the above-described resin (b) is divided between the stages (III-0), (III-1) and (III-2). In stage (III-0), the resin (b) is used in an amount of 7.0 to 10.6 parts by mass with respect to 100 parts by mass of shaving leather (dry standard), preferably 8.0 to 9.5 parts by mass, and more preferably, 8.5 to 9.0 parts by mass. If the amount of resin (b) exceeds the above-described upper limit, the finished leather may become hard and lack flexibility, and if it is less than the above-described lower limit, it may not be possible to effectively suppress the occurrence of wrinkling in the finished leather. The amount of each of the above-described resins (1), (b2) and (b3) is not particularly limited as long as the total amount thereof is within the range of the amount of the above-described resin (b). In the stage (III-0), as the resin (b), more preferably, resin (b1) —that is, a polymer consisting of one selected from the group consisting of acrylic acid, methacrylic acid, acrylic acid ester and methacrylic acid ester, or a mixture of these polymers—is used.

In the above-described stage (III-0), as long as the effect of the present invention is not impaired, commonly-used retanning agents and other known substances such as pH regulators, dispersants, softeners, degreasers and the like can be included. The stage (III-0) is usually carried out at a temperature of 35 to 45° C. for 2 to 3 hours. Leather that has been treated in this way is usually washed with water according to a conventional method and then subjected to the subsequent processes.

In the above-described stage (III-1), the shaving leather subjected to retanning treatment in the above-described stage (III-0) is further subjected to retanning treatment using the retanning agent (a) and the resin (b), and at the same time, is subjected to fatliquoring treatment using the fatliquoring agent (c). Examples of the retanning agent (a) used in the retanning treatment include a condensate (a1) of aromatic sulfonic acid and formaldehyde. The above-described condensate (a1) of aromatic sulfonic acid and formaldehyde is known. As the condensate (a1) of aromatic sulfonic acid and formaldehyde, preferably, a condensed product of two molecules of aromatic sulfonic acid and one molecule of formaldehyde is used. Examples of the aromatic sulfonic acid include naphthalene sulfonic acid, phenol sulfonic acid, sulfonated ditryl ether, 4,4'-dihydroxydiphenyl sulfone, sulfonated diphenylmethane, sulfonated biphenyl, sulfonated terphenyl, benzene sulfonic acid, naphthalene disulfonic acid, phenol disulfonic acid, disulfonated ditryl ether, 4,4'-dihydroxydiphenyl disulfone, disulfonated diphenylmethane, disulfonated biphenyl, disulfonated terphenyl and benzene disulfonic acid. Preferably, naphthalene sulfonic acid and phenol sulfonic acid are used. The weight average molecular weight of the condensate (a1) of aromatic sulfonic acid and formaldehyde is preferably 100 to 5,000. Here, a condensate of naphthalene sulfonic acid and formaldehyde can be produced as described below. For example, naphthalene is sulfonated at 145° C. for 2 hours using a 1.4 equivalent amount of $H_2SO_4$. 1,000 grams of the mixture of naphthalene sulfonic acid thus obtained, 800 grams of bishydroxyphenyl sulfone and 250 ml of a 37% formaldehyde solution are reacted at 100 to 120° C. for 3 hours and condensed, and the resulting product is adjusted to a pH of 3.5, and after adjusting the acid value to 80 with sodium hydroxide solution and phthalic acid, spray-dried. Alternatively, after sulfonation at 145° C. for 3 hours using 1.4 mol of $H_2SO_4$, naphthalene is reacted for 3 hours with 0.66 mol of formaldehyde and condensed. The resulting product is cooled, adjusted to a pH of 3.5, and then, after adjusting the acid value to 50 with a sodium hydroxide solution and glutaric acid, spray-dried. The weight average molecular weight of the condensate of these naphthalene sulfonic acids and formaldehyde is preferably 200 to 2,000, and the center molecular weight is about 1,300. Commercial products include Basyntan FO, and Tamol NA (both trademarks, manufactured by STAHL), Ukatan GM (trademark, manufactured by Schill & Seilacher), Tanigan BN (trademark, manufactured by LANXESS), Irgatan LV (trademark, manufactured by TLF), and BELLCOTAN A, BELLCOTAN PT, and BELLCOTAN PS (all trademarks, manufactured by Nippon Fine Chemical). Further, a condensate of phenol sulfonic acid and formaldehyde can be produced as described below. For example, 1 mol of phenol sulfonic acid and 3 mol of bishydroxyphenyl sulfone are reacted with 2 mol of formaldehyde at 100 to 120° C. in an aqueous solution adjusted to a pH of 6 to 9 and condensed. Then, the pH is adjusted to 3.5 with sulfuric acid, and further, the acid value is adjusted to 120 with phthalic acid, after which spray-drying is performed. Alternatively, a sodium salt of phenol sulfonic acid (65% solution) and bishydroxyphenyl sulfone (55% suspension) are mixed at a molar ratio of 2.5:1. To the mixture, a 2.5 equivalent amount of formaldehyde (30% solution) is added, reacted at 112 to 115° C. for 3 hours, and condensed. The obtained condensate is spray-dried after adjusting the acid value to 100 with adipic acid. The weight-average molecular weight of the condensate of these phenol sulfonic acids and formaldehyde is preferably 400 to 4,000, and the center molecular weight is about 3,000. Commercial products include Basyntan DLX-N, Basyntan MLB, Basyntan SL, Basyntan SW Liquid, and Tamol NNOL (all trademarks, manufactured by STAHL), and Tanigan WLF (trademark, manufactured by LANXESS). Here, the retanning agent (a) —that is, the condensate (a1) of an aromatic sulfonic acid and formaldehyde—is used in an amount of 12.8 to 19.2 parts by mass with respect to 100 parts by mass of shaving leather (dry standard), preferably 14.5 to 17.5 parts by mass, and more preferably, 15.0 to 17.0 parts by mass. If the amount of the condensate (a1) of the aromatic sulfonic acid and formaldehyde is less than the above-described lower limit, the wrinkling suppression effect may be insufficient, and if it exceeds the above-described upper limit, hardening may occur and texture may be impaired.

In the above-described stage (III-1), as the retanning agent (a), in addition to the condensate (a1) of an aromatic sulfonic acid and formaldehyde, a sodium salt (a2) of an aromatic sulfonic acid and an aromatic carboxylic acid, and/or a vegetable tannin (a3) can also be used. In the sodium salt (a2) of an aromatic sulfonic acid and an aromatic carboxylic acid, the aromatic sulfonic acid can be the same as those exemplified in the above-mentioned condensate (a1) of an aromatic sulfonic acid and formaldehyde. Further, examples of the aromatic carboxylic acid include salicylic acid, terephthalic acid, 2,6-naphthalene dicarboxylic acid, and 4,4'-biphenyl dicarboxylic acid. Further, examples of the vegetable tannin (a3) include condensed tannins such as mimosa (wattle), kepracho and gambia, and hydrolyzed tannins such as chestnut, miropalan and tara. Preferably, mimosa (wattle) tannin is used. Here, the sodium salt (a2) of an aromatic sulfonic acid and an aromatic carboxylic acid is, with respect to 100 parts by mass of shaving leather (dry standard), preferably used in an amount of 2.0 to 7.0 parts by mass, more preferably, 3.0 to 6.0 parts by mass, and still more preferably, 4.0 to 5.0 parts by mass. Further, the vegetable tannin (a3) is, likewise, with respect to 100 parts by mass of shaving leather (dry standard), preferably used in an amount of 8.0 to 19.0 parts by mass, more preferably, 10.0 to 17.0 parts by mass, and still more preferably, 10.0 to 12.0 parts by mass.

As the resin (b) used for the retanning treatment in stage (III-1), similarly to the above-described stage (III-0), a resin (b) that is one or more selected from the group consisting of (b1) a polymer consisting of one selected from the group consisting of acrylic acid, methacrylic acid, acrylic acid ester and methacrylic acid ester, or a mixture of these polymers, (b2) a polymer consisting of two or more selected from the group consisting of acrylic acid, methacrylic acid, acrylic acid ester and methacrylic acid ester, or a mixture of these polymers, and (b3) a polycondensate of melamine and formaldehyde, is used. The resin (b), with respect to 100 parts by mass of shaving leather (dry standard), is used in an amount of 19.7 to 29.5 parts by mass, preferably 22.0 to 27.0 parts by mass, and more preferably, 24.0 to 25.5 parts by mass. If the amount of resin (b) exceeds the above-described upper limit, the finished leather may become hard and lack flexibility, and if it is less than the above-described lower limit, it may not be possible to effectively suppress the occurrence of wrinkling in the finished leather. The amount of each of the above-described resins (b1), (b2) and (b3) is not particularly limited as long as the total amount thereof is within the range of the amount of the above-described resin (b). With respect to 100 parts by mass of shaving leather (dry standard), the resin (b1) is preferably 5.3 to 8.5 parts by mass, more preferably 6.0 to 7.4 parts by mass, and yet more preferably 6.4 to 6.9 parts by mass, the resin (b2) is preferably 7.2 to 10.5 parts by mass, more preferably 8.0 to 9.8 parts by mass, and yet more preferably 8.8 to 9.3 parts by mass, and the resin (b3) is preferably 7.2 to 10.5 parts by mass, more preferably 8.0 to 9.8 parts by mass, and yet more preferably 8.8 to 9.3 parts by mass. In stage (III-1), as the resin (b), more preferably, (1) a polymer consisting of one selected from the group consisting of acrylic acid, methacrylic acid, acrylic acid ester and methacrylic acid ester, or a mixture of these polymers, (b2) a polymer consisting of two or more selected from the group consisting of acrylic acid, methacrylic acid, acrylic acid ester and methacrylic acid ester, or a mixture of these polymers, and (b3) a polycondensate of melamine and formaldehyde, are used in combination.

Synthetic oil and/or natural oil (c1) is used as the fatliquoring agent (c) used in the fatliquoring treatment in stage (III-1). Preferably, a mixture of synthetic oil and natural oil is used. The mixing ratio of the two is not particularly limited; and, preferably, the mass ratio of synthetic oil:natural oil is 0.4 to 0.6:0.6 to 0.4. The oil (c1) preferably exists as an O/W type emulsion, in which the oil (c1):water mass ratio is preferably 1:4 to 1:6, more preferably 1:4.5 to 1:5.5, and is usually about 1:5. Further, the shape of the oil droplet of the oil (c1) is not particularly limited, and a substantial sphere or substantially ellipsoidal sphere is preferably used, and a substantially ellipsoidal sphere is more preferably used. The oil (c1) having an oil droplet shape that is a substantially ellipsoidal sphere means that when a given external force is applied—for example, when a container such as a cylindrical drum is rotated when applying a fatliquoring agent to leather—the shape of the oil droplet easily changes to an ellipsoidal sphere. Usually, the emulsion is subjected to conductive treatment after preparing a sample by a freezing-fracture method, preferably observed with an electron microscope at a magnification of 10,000 to 15,000, and checked as to whether the shape of the oil droplet is a substantial sphere or substantially ellipsoidal sphere, whereby it can be determined whether it is any of the foregoing. In the oil (c1), the number of oil droplets having a substantially spherical shape—that is, the number of substantially spherical oil droplets in a similar electron microscope field of view to that described above—is preferably 80% or more of the total number of oil droplets, and more preferably, 90% or more, and similarly, the number of oil droplets having a substantially ellipsoidal sphere shape—that is, the number of substantially ellipsoidal spherical oil droplets in a similar electron microscope field of view to that described above—is preferably 60% or more of the total number of oil droplets, more preferably, 70% or more, still more preferably, 80% or more, and even yet more preferably, 90% or more. Regarding the dimensions of the oil droplets of the oil (c1), in a similar electron microscope field of view to that described above, for substantial spheres, the substantially circular diameter is preferably 5.0 µm or less, and for substantially ellipsoidal spheres, the long diameter of the substantially elliptical shape is preferably 10.0 µm or less, and the short diameter is preferably 5.0 µm or less, and the average value of the ratio of the long diameter/short diameter is preferably 1.20 to 2.50, more preferably 1.50 to 2.30, and yet more preferably 1.50 to 2.00. Here, as the synthetic oil, a sulfonated oil is used, sulfonated oil being a general term for self-emulsifying oils obtained by reacting a sulfonating agent such as anhydrous sulfuric acid with a hydrocarbon or the like and directly binding a sulfone group ($—C—SO_3H$) and, for example, alkyl sulfonic acids consisting of polyolefins are used. Further, examples of natural oils include sulfated oils such as ester sulfuric acids of animal and vegetable glycerides, sulfite oils such as alkyl sulfonic acids of fish oil glycerides, and monoglyceride oils. As the fatliquoring agent (c)—that is, the synthetic oil and/or natural oil (c1)—commercially available products can be used, such as Lipsol LQ (shape of oil droplets: substantial sphere), Lipsol MSG (oil droplet shape: substantially ellipsoidal sphere), and Lipsol MPA (shape of oil droplet: substantially ellipsoidal sphere) (all trademarks, manufactured by Schill & Seilacher). In addition, addition of the fatliquoring agent (c) consisting of synthetic oil and/or natural oil (c1) is divided between stages (III-1) and (III-2). In stage (III-1), the fatliquoring agent (c) consisting of synthetic oil and/or natural oil (c1), with respect to 100 parts by mass of shaving leather (dry standard), is used in an amount of 3.4 to 5.2 parts by mass, preferably 4.0 to 4.7 parts by mass, and more preferably, 4.1 to 4.5 parts by mass. When the amount of the fatliquoring agent (c1) is less than the above-described lower limit, it may not be possible to impart an appropriate amount of flexibility to the finished leather, and when the above-described upper limit is exceeded, wrinkling may easily occur.

In the above-described stage (III-1), as long as the effect of the present invention is not impaired, known substances such as pH adjusters, dispersants, softeners, penetrants, fatliquoring agents or the like can also be included. Stage (III-1) is usually carried out at a temperature of 15 to 30° C. for 2 to 3 hours. Further, it is preferable to perform dyeing together with stage (III-1) or after the completion of stage (III-1) according to a known method. As the dye, known dyes can be used, and examples thereof include acid dyes and reactive dyes. Leather that has been treated in this way is usually washed with water according to a conventional method and then subjected to the subsequent processes.

In stage (III-2), the shaving leather treated as described above is further subjected to retanning treatment using the resin (b), and at the same time, is subjected to fatliquoring treatment using the fatliquoring agent (c). As the resin (b), similarly to in the above-described stages (III-0) and (III-1), a resin (b) that is one or more selected from the group consisting of (b1) a polymer consisting of one selected from the group consisting of acrylic acid, methacrylic acid, acrylic acid ester and methacrylic acid ester, or a mixture of these polymers, (b2) a polymer consisting of two or more selected from the group consisting of acrylic acid, methacrylic acid, acrylic acid ester and methacrylic acid ester, or a mixture of these polymers, and (b3) a polycondensate of melamine and formaldehyde, is used. The resin (b), with respect to 100 parts by mass of shaving leather (dry standard), is used in an amount of 5.3 to 7.9 parts by mass, preferably 6.0 to 7.2 parts by mass, and more preferably, 6.0 to 7.0 parts by mass. If the amount of resin (b) exceeds the above-described upper limit, the finished leather may become hard and lack flexibility, and if it is less than the above-described lower limit, it may not be possible to effectively suppress the occurrence of wrinkling in the finished leather. The amount of each of the above-described resins (b1), (b2) and (b3) is not particularly limited as long as the total amount thereof is within the range of the amount of the above-described resin (b). In the stage (III-2), as the resin (b), more preferably, resin (b1) —that is, a polymer consisting of one selected from the group consisting of acrylic acid, methacrylic acid, acrylic acid ester and methacrylic acid ester, or a mixture of these polymers—is used.

As the fatliquoring agent (c) in the stage (III-2), the same fatliquoring agent as the fatliquoring agent described in the above-described stage (III-1) —that is, the synthetic oil and/or natural oil (c1) —is used. Here, the synthetic oil and/or natural oil (c1), with respect to 100 parts by mass of shaving leather (dry standard), is used in an amount of 7.0 to 10.4 parts by mass, preferably 8.0 to 9.5 parts by mass, and more preferably, 8.5 to 9.0 parts by mass. If the amount of the fatliquoring agent (c1) is less than the above-described lower limit, it may not be possible to impart appropriate flexibility to the finished leather, and when the above-described upper limit is exceeded, wrinkling may easily occur.

In the above-described stage (III-2), as the fatliquoring agent (c), in addition to the above-described synthetic oil and/or natural oil (c1), a silicone-containing polymer dispersion (c2) can also be used. The silicone-containing polymer dispersion (c2) imparts water repellency to the finished leather, and as the silicone-containing polymer dispersion (c2), a commercially available product can be used, examples of which include Densordrin DP (trademark, manufactured by STAHL). Here, the silicone-containing polymer dispersion (c2), with respect to 100 parts by mass of shaving leather (dry standard), is preferably used in an amount of 10.0 to 17.0 parts by mass, and more preferably, 12.0 to 15.0 parts by mass. In addition, in stage (III-2), as long as the effect of the present invention is not impaired, known substances such as softeners, deodorants, fungicides, fixing agents or the like can also be included. Stage (III-2) is usually carried out at a temperature of 40 to 60° C. for 0.5 to 2 hours. Leather that has been treated in this way is usually washed with water according to a conventional method and then subjected to the subsequent processes.

In the present invention, the leather obtained from (III) the retanning process is, in the subsequent (IV) drying and finishing process, sequentially subjected to (IV-1) a stage of drying at reduced pressure and (IV-2) a stage of drying at atmospheric pressure. The conditions for the above-described reduced-pressure drying are a temperature of 35 to 45° C., and preferably 37 to 43° C., a pressure that is any pressure lower than atmospheric pressure (about 101 kPa), preferably 25 to 45 kPa, and more preferably 30 to 40 kPa, and a time of 1 to 5 minutes, and preferably 2 to 4 minutes, and further, the conditions for the above-described drying at atmospheric pressure are a temperature of 35 to 45° C., and preferably 37 to 43° C., and a time of 10 to 40 minutes, and preferably 20 to 30 minutes. In the present invention, under such conditions, reduced-pressure drying and drying at atmospheric pressure are combined and sequentially carried out, as a result of which it is possible to more effectively suppress the occurrence of wrinkling while maintaining an appropriate flexibility of the leather obtained in (III) the retanning process. Here, in the reduced-pressure drying, the leather obtained from (III) the retanning step is spread out and stretched so that the leather surface contacts a stainless steel flat plate, the opposite side (the rear side of the leather) is covered with a mesh plate, the leather is sandwiched between these two plates, and while reducing the pressure of the entirety to the specified pressure, the reduced-pressure drying is carried out by holding the same at the above-described predetermined temperature for the above-described predetermined time. Further, in the drying at atmospheric pressure, the leather after the reduced-pressure drying is placed in a thread conveyor-type (a conveyor with about 200 threads of about 2 mm in diameter stretched per roll) drying furnace (the leather enters from the top of a 7-level furnace and moves downward in a zigzag manner), for example, and while blowing warm air at the above-described specified temperature from both sides of the leather, the drying at atmospheric pressure is carried out by moving the leather through the inside of the drying furnace for the above-described predetermined time.

In the method of producing leather in the present invention, processes other than (III) the retanning process and the drying in (IV) the drying and finishing process—that is, (I) the pretreatment process, (II) the tanning process, and (IV) the finishing process—can be performed by conventionally known methods. The pretreatment process (I) (also called the preparation process) is a process of performing preparatory work prior to tanning, and is a general term for refining work performed to remove components that are unnecessary in leather, such as hair, epidermis, unnecessary proteins and fats, from the raw hide of an adult cow, loosen collagen fiber bundles in the dermic layer, and enhance the properties of the leather. First, by soaking in water, cattle hide tissue is hydrated to restore it to a state close to rawhide, and dirt, salt, soluble proteins in the skin and the like adhering to the raw hide are removed by washing or are solved out. After washing with water, the hide is taken out and freshened, and the rear glue (fat and meat) is mechanically removed. Next, liming is performed. Liming is the work of immersing the raw hide in a lime solution prepared so as to have a supersaturated concentration of calcium oxide, and usually, a lime solution to which a hair removal accelerator such as sodium sulfide has been added is used in order to enhance the action and shorten the treatment time. As a result, together with destruction of the hair and epidermis, removal of unnecessary proteins, and saponification of fatty acid esters, the hide is swollen and the fibrous structure is loosened and untangled. To make this treatment effective, in many cases, the liming is divided and depilatory liming, which is mainly used for hair removal, followed by reliming with only a pure lime solution, are performed. This promotes homogenization of the fibrous structure of the hide and softening of the leather. As a result of the liming, hair on the hide surface is dissolved, dirt on the hide surface is removed, the lime permeates into the hide, and the fibers are loosened. After hair removal, division is performed. Because the thickness of the pelt varies between regions of the hide and between hides, in order to adjust the thickness of the hide, the hide is divided into the grain layer (the front surface of the hide) and the split (the back surface of the hide) using a band knife. In this process, treatment is performed for the purpose of removing keratin from the epidermis and elastin from the lower layer. The leather is then in a state in which components other than collagen fibers have been removed from the hide tissue.

In (II) the subsequent tanning process, the grain layer and the split obtained in (I) the pretreatment process are first decalcified to neutralize and remove the lime used in the previous process. The decalcification is a treatment to facilitate the action of the proteolytic enzyme used in the bating process performed subsequently on the grain layer and the split, and is carried out by spraying water containing 1 to 2% ammonium chloride-containing sodium hydrogen sulfite or the like at a temperature of 30 to 35° C. Next, as the proteolytic enzyme, using a bating agent containing an enzyme such as pancreatin, the grain layer and the split are impregnated with water containing 0.8 to 1.2% by mass of the enzyme and 0.5% by mass of ammonium chloride and bated, the collagen tissue is softened, the enzyme removed, and next, tanning is performed using a chromium tanning agent. As the chromium tanning agent, a trivalent chromium complex is used, which has six ligands with a trivalent chromium atom as a nucleus, and examples include a chromium ammine complex $[Cr(NH_3)_6]Cl_3$, and a chromium aqua complex $[Cr(H_2O)_6]Cl_3$. This operation is performed by impregnation with water containing a tanning agent. The above-described series of treatments such as decalcification, bating and tanning are carried out in one drum over time. After the tanning treatment is finished, and after dehydration and stretching to the desired hide thickness, the thickness is adjusted by scraping the back side (this operation is called shaving), and further, unnecessary parts around the hide edges are cut off (this operation is called trimming). By this series of operations, the shaving leather is obtained. The shaving leather is used in (III) the subsequent retanning process. In the present invention, the treatments of each of the above-described stages are carried out in (III) the retanning process.

Next, the leather obtained via (IV-1) the stage of reduced-pressure drying and (IV-2) the stage of atmospheric pressure drying in (IV) the drying and finishing process is subjected to a subsequent finishing process. In this finishing process, the leather, which has been rendered into a dried state via the above-described drying stages is conditioned and the moisture content is adjusted. The softness of the leather is then adjusted by vibration staking, and then the leather is milled to loosen the fibers of the leather and soften the leather. Here, milling is a process of loosening and softening the leather fibers by the impact of dropping, by putting the leather that has undergone the above-described drying stages into a drum and rotating. Since leather for automobile seats is required to be soft, it is generally incorporated into the process, and is usually carried out for 3 to 4 hours. Since the fine entanglement of leather fibers is loosened, it may not satisfy the objective of suppressing the occurrence of wrinkling. In the present invention, except for cases in which the finish is particularly hard, the process is carried out for about 1 to 2 hours, which is shorter than usual. In the present invention, since a predetermined fatliquoring agent (c) is used, soft leather can be obtained even if the processing time is shortened. Next, the leather is fixed to a net by toggles and stretched to perform drying by toggling. If desired, the above-described conditioning, vibration staking, milling, and drying by toggling operations can be repeated. Next, trimming is performed to shape the leather by cutting off the edges that have become hard as a result of drying, scissor marks from the toggles, and extremely thin portions. The surface of the leather is coated and colored to protect the surface of the leather and provide a finish that enhances the aesthetic appearance. A semi-aniline finish is preferably used for the finishing. Dyes and pigments are used together as colorants. As a binder, a protein-based binder having casein as a main component and/or an emulsion or a water-soluble type synthetic resin can be incorporated and used, and scratches and irregularities on the grain surface are covered, leaving a grain pattern on the hide surface. Accordingly, small scratches can be made inconspicuous and a colorless film is formed or a colored film is formed using a colorant. A rotary spray machine is used as the coating method. By proceeding through this series of processes, the leather in the present invention ultimately can be produced.

Hereinafter, the present invention is described in further detail in examples; however, the present invention is not limited to these examples.

EXAMPLES

Substances

The respective substances used in the Examples and Comparative Examples are as follows.

(a) Retanning Agent (a1) Condensate of an Aromatic Sulfonic Acid and Formaldehyde:

Ukatan GM (trademark, manufactured by Schill & Seilacher, condensate of naphthalene sulfonic acid and formaldehyde, weight-average molecular weight: 1,400)

Basyntan FO (trademark, manufactured by STAHL, condensate of naphthalene sulfonic acid and formaldehyde, weight-average molecular weight: 1,300)

(b) Resin (b1) Polymer Consisting of One Selected from the Group Consisting of Acrylic Acid, Methacrylic Acid, Acrylic Acid Ester and Methacrylic Acid Ester, or a Mixture of these Polymers:

Relugan RV (trademark, manufactured by STAHL, mixture of homopolymers of each of the above-described substances, weight-average molecular weight: 70,000)

(b2) Polymer consisting of two or more selected from the group consisting of acrylic acid, methacrylic acid, acrylic acid ester and methacrylic acid ester, or a mixture of these polymers:

Relugan RE (trademark, manufactured by STAHL, mixture of copolymers of each of the above-described substances, weight-average molecular weight: 100,000) (b3) polycondensate of melamine and formaldehyde:

Relugan DLF (trademark, manufactured by STAHL, weight-average molecular weight: 50,000)

(c) Fatliquoring Agent (c1) Synthetic Oil and/or Natural Oil:

Lipsol MSG (trademark, manufactured by Schill & Seilacher, mixture of synthetic and natural oils, synthetic oil:natural oil (mass ratio)=approx. 1:1, O/W type emulsion, oil:water (mass ratio)=about 1:5, oil droplet shape: substantially ellipsoidal sphere, number of substantially ellipsoidal spheres among all oil droplets: 90% or more, substantially ellipsoidal sphere dimensions: long diameter: 6.5 μm or less, short diameter: 4.0 μm or less, average value of long diameter/short diameter ratio: about 1.80)

Lipsol LQ (trademark, manufactured by Schill & Seilacher, mixture of synthetic and natural oils, synthetic oil:natural oil (mass ratio)=approx. 1:1, O/W type emulsion, oil:water (mass ratio)=about 1:5, oil droplet shape: substantial sphere, number of substantial spheres among all oil droplets: 95% or more, substantial sphere dimensions: diameter 3.0 μm or less)

(d) Retanning Agent
(d1) Chromium:
Trivalent chromium complex (BASOCHROM33, manufactured by VOELPKER)
(d2) Glutaraldehyde Example 1

The leather used is shaving leather obtained by scraping (shaving) the split surface, and adjusting the thickness, of the leather obtained by treatment in the above-described known pretreatment process (I), then, in the similarly above-described known tanning process (II), after treating the leather (wet blue) with water at 40° C. for about 8 hours and rehydrating with hot water, removing the water and, further, after washing with water at 40° C. for about 10 minutes, removing the water and then performing dehydration (sammying). The dimensions of the shaving leather were 200 to 300 cm in length (head-to-tail direction) and 160 to 300 cm in width (dorsoventral direction). The shaving leather was cut in the length direction so that the width was substantially halved, to obtain a side leather. The side leather was used in the example. The device used was a cylindrical drum with a diameter of about 120 cm and a height of about 50 cm, the drum was placed horizontally, and the rotation speed of the drum was set to 18 rpm in each treatment. Five pieces of the above-described shaving leather (water content: about 55% by mass) were loaded into the apparatus and washed with water at 40° C. for about 10 minutes, and then the water was removed. Next, 1.5 parts by mass each of sodium formate and sodium hydrogen carbonate were added to 100 parts by mass (about 15 liters) of 40° C. water, and relative to 100 parts by mass of shaving leather (dry standard), retanning agents (d1) chromium and (d2) glutaraldehyde were each added in an amount of 9.0 parts by mass (18.0 parts by mass in total), and Relugan RV as resin (b1) was added in an amount of 8.8 parts by mass, treatment was performed for about two and a half hours, and at the same time as neutralization treatment, the retanning treatment of stage (III-0) was performed, after which the water was removed. Then, after washing with water at 25° C. for about 5 minutes, the water was removed. Next, 25° C. water was added, and further, relative to 100 parts by mass of shaving leather (dry standard), as the retanning agent (a1), 5.0 parts by mass of Ukatan GM and 11.0 parts by mass of Basyntan FO (16.0 parts by mass in total) were added, and in addition, relative to 100 parts by mass of shaving leather (dry standard), 6.6 parts by mass of Relugan RV as the resin (b1), 9.0 parts by mass of Relugan RE as the resin (b2), and 9.0 parts by mass of Relugan DLF as the resin (b3) (24.6 parts by mass in total) were added, and further, relative to 100 parts by mass of shaving leather (dry standard), as the fatliquoring agent (c1), 4.3 parts by mass of Lipsol MSG (oil droplet shape: substantially ellipsoidal sphere) were added and treatment performed for 50 minutes, the stages of retanning and fatliquoring treatment of (III-1) were implemented, next, a dye (Ceraset manufactured by TLF) was added and treatment performed for 60 minutes, the pH was adjusted to 4 using formic acid and the dye was fixed (dyeing), after which the water was removed. The time required for the stages of retanning and fatliquoring treatment of (III-1) and the subsequent fixing of the dye until removal of the water was about 2 hours in total. Then, after washing with water at 50° C. for about 5 minutes, the water was removed. Next, 60° C. water was added, and further, relative to 100 parts by mass of shaving leather (dry standard), 8.7 parts by mass of Lipsol MSG were added as the fatliquoring agent (c1), and 6.6 parts by mass of Relugan RV were added as the resin (1), treatment was performed for about 1 hour, and after carrying out the stages of resin tanning and fatliquoring treatment of (III-2), the water was removed. Then, after washing with water at 50° C. for about 5 minutes and further with water at 25° C. for about 5 minutes, the water was removed and the retanning process (III) was completed.

After completion of the retanning process (III), using a setter, the obtained moist leather was stretched, the surface was smoothened and the shape adjusted, and the water content of the leather was set to about 50% by mass. Next, the leather was spread out and stretched so that the leather surface contacted a stainless steel flat plate, the surface at the opposite side (the back surface of the leather) was covered with a reticular plate of about 50 mesh, the leather was sandwiched between these two plates, the lid was closed, and reduced-pressure drying was performed. The conditions for the reduced-pressure drying were a temperature of 40° C., a pressure of about 40 kPa, and a time of 2 minutes. After the reduced-pressure drying, warm air was then blown at the leather at 40° C. for 30 minutes on both sides of the leather to perform drying at atmospheric pressure, and ultimately, a leather dried to a water content of about 15% by mass was obtained. The leather was subjected to a subsequent finishing process and the softness of the leather was adjusted by vibration staking, after which milling was performed for 1 hour to loosen the fibers of the leather and soften the leather. Then, after applying a base coat, a color coat and a top coat, characteristics were evaluated as described below. One piece of the obtained leather was used for each characteristic evaluation.

Example 2

Except for the fact that five pieces of shaving leather (water content: about 56% by mass) were prepared and the fatliquoring agent (c1) Lipsol MSG (oil droplet shape: substantially ellipsoidal sphere) was replaced with Lipsol LQ (oil droplet shape: substantial sphere), this example was carried out identically to Example 1 and subjected to the following characteristic evaluations.

Example 3

In this example, the amounts of each of the substances added in the respective stages (III-0), (III-1) and (III-2) of the retanning process (III) were reduced within the scope of the present invention. In the retanning process of stage (III-0), five pieces of shaving leather (water content: about 55% by mass) were prepared, the retanning agents (d1) chromium and (d2) glutaraldehyde were each added in an amount of 7.65 parts by mass (15.3 parts by mass in total), and Relugan RV as resin (b1) was added in an amount of 7.5 parts by mass, in the retanning and fatliquoring treatment of stage (III-1), as the retanning agent (a1), 4.3 parts by mass of Ukatan GM and 9.4 parts by mass of Basyntan FO (13.6 parts by mass in total) were added, in addition, 5.6 parts by mass of Relugan RV as the resin (1), 7.7 parts by mass of Relugan RE as the resin (b2), and 7.7 parts by mass of Relugan DLF as the resin (b3) (20.9 parts by mass in total) were added, further, 3.7 parts by mass of Lipsol MSG were added as the fatliquoring agent (c1), and in the resin tanning and fatliquoring treatment of stage (III-2), 7.4 parts by mass of Lipsol MSG were added as the fatliquoring agent (c1), and 5.6 parts by mass of Relugan RV were added as the resin (1). Apart from the matters described above, this example was carried out identically to Example 1 and subjected to the following characteristic evaluations.

Example 4

In this example, the amounts of each of the substances added in the respective stages (III-0), (III-1) and (III-2) of the retanning process (III) were increased within the scope of the present invention. In the retanning process of stage (III-0), five pieces of shaving leather (water content: about 55% by mass) were prepared, the retanning agents (d1) chromium and (d2) glutaraldehyde were each added in an amount of 10.35 parts by mass (20.7 parts by mass in total), and Relugan RV as resin (b1) was added in an amount of 10.1 parts by mass, in the retanning and fatliquoring treatment of stage (III-1), as the retanning agent (a1), 5.75 parts by mass of Ukatan GM and 12.75 parts by mass of Basyntan FO (18.5 parts by mass in total) were added, in addition, 7.7 parts by mass of Relugan RV as the resin (b1), 10.35 parts by mass of Relugan RE as the resin (b2), and 10.35 parts by mass of Relugan DLF as the resin (b3) (28.4 parts by mass in total) were added, further, 5.0 parts by mass of Lipsol MSG were added as the fatliquoring agent (c1), and in the resin tanning and fatliquoring treatment of stage (III-2), 10.0 parts by mass of Lipsol MSG were added as the fatliquoring agent (c1), and 7.7 parts by mass of Relugan RV were added as the resin (b1). Apart from the matters described above, this example was carried out identically to Example 1 and subjected to the following characteristic evaluations.

Comparative Example 1

Five pieces of shaving leather (water content: about 56% by mass) were prepared, and warm air at 40° C. was blown onto both sides of the leather for 50 minutes without performing reduced-pressure drying, and drying at atmospheric pressure was carried out such that the water content of the leather changed from about 50% by mass to about 15% by mass; apart from this, this example was carried out identically to Example 1 and subjected to the following characteristic evaluations.

Comparative Example 2

In this comparative example, the total amount of the resin (b) added was reduced, and the amount added of the resin used in the respective stages (III-0), (III-1) and (III-2) was lowered below the scope of the present invention. Five pieces of shaving leather (water content: about 56% by mass) were prepared, and the total amount of the resin (b) added was 25.0 parts by mass. In conjunction with this, in stage (III-0), 5.5 parts by mass of Relugan RV were added as the resin (b1), in stage (III-1), 4.2 parts by mass of Relugan RV as the resin (1), 5.6 parts by mass of Relugan RE as the resin (b2), and 5.6 parts by mass of Relugan DLF as the resin (b3) (15.4 parts by mass in total) were added, and in stage (III-2), 4.1 parts by mass of Relugan RV were added as the resin (b1). Apart from the matters described above, this example was carried out identically to Example 1 and subjected to the following characteristic evaluations.

Comparative Example 3

Five pieces of shaving leather (water content: about 55% by mass) were prepared, and the total amount of the fatliquoring agent (c1) Lipsol MSG added was 5.0 parts by mass. In conjunction with this, the amount of the fatliquoring agent (c1) added in the stage (III-1) was 1.7 parts by mass, and the amount of the fatliquoring agent (c1) added in the stage (III-2) was 3.3 parts by mass. Apart from the matters described above, this example was carried out identically to Example 1 and subjected to the following characteristic evaluations.

Comparative Example 4

In this comparative example, stage (III-0) was not carried out, the resin tanning was carried out only in stage (III-1), and the fatliquoring treatment was carried out only in stage (III-2). Five pieces of shaving leather (water content: about 55% by mass) were prepared in the same device as in Example 1, after adding 1.5 parts by mass of each of sodium formate and sodium hydrogen carbonate to 100 parts by mass (about 15 liters) of water at 40° C. and performing treatment for about two and a half hours to perform neutralization treatment, the water was removed. Then, after washing with water at 25° C. for about 5 minutes, the water was removed. Without performing stage (III-0), next, 25° C. water (about 15 liters) was added, and further, relative to 100 parts by mass of shaving leather (dry standard), as the retanning agent (a1), 5.0 parts by mass of Ukatan GM and 11.0 parts by mass of Basyntan FO (16.0 parts by mass in total) were added, and in addition, relative to 100 parts by mass of shaving leather (dry standard), 22.0 parts by mass of Relugan RV as the resin (b1), 9.0 parts by mass of Relugan RE as the resin (b2), and 9.0 parts by mass of Relugan DLF as the resin (b3) (40.0 parts by mass in total) were added and treatment performed for 50 minutes, and after the retanning treatment stage of (III-1) was implemented, the dye was fixed (dyeing) identically to in Example 1. Next, 60° C. water was added, and further, relative to 100 parts by mass of shaving leather (dry standard), 13.0 parts by mass of Lipsol MSG were added as the fatliquoring agent (c1), and after performing treatment for about 1 hour and carrying out the fatliquoring treatment stage of (III-2), the water was removed. Then, after washing with water at 50° C. for about 5 minutes, and after removing the water and further washing with water at 25° C. for about 5 minutes, the water was removed and the retanning process (III) was completed.

After completion of the retanning process (III), reduced-pressure drying and atmospheric-pressure drying were performed in the same manner as in Example 1, and ultimately, a leather dried to a water content of about 15% by mass was obtained. The leather obtained by then performing the finishing process in the same manner as in Example 1 was subjected to the following characteristic evaluations.

Comparative Example 5

In this comparative example, the resin tanning was carried out only in stage (III-1), and the fatliquoring treatment was carried out only in stage (III-2). Five pieces of shaving leather (water content: about 55% by mass) were prepared, in stage (III-0) and stage (III-2), the resin (b1) Relugan RV was not added, the total amount of the resin (b1) added in the stage (III-0) and stage (III-2) was 15.4 parts by mass, and added to the resin (b1) in the stage (III-1) was 22.0 parts by mass. Apart from the matters described above, this example was carried out identically to Example 1 and subjected to the following characteristic evaluations.

Comparative Example 6

In this comparative example, only the amount of the resin added in stage (III-0), stage (III-1) and stage (III-2) was lower than the scope of the present invention. five pieces of shaving leather (water content: about 55% by mass) were prepared, and the total amount of the resin (b) added was 24.4 parts by mass. In conjunction with this, in stage (III-0), 5.5 parts by mass of Relugan RV were added as the resin (1), in stage (III-1), 4.2 parts by mass of Relugan RV as the resin (b1), 5.6 parts by mass of Relugan RE as the resin (b2), and 5.6 parts by mass of Relugan DLF as the resin (b3) (15.4 parts by mass in total) were added, and in stage (III-2), 3.5 parts by mass of Relugan RV were added as the resin (b1). Apart from the matters described above, this example was carried out identically to Example 1 and subjected to the following characteristic evaluations.

Comparative Example 7

In this comparative example, the amounts of the respective substances added in stage (III-0), stage (III-1) and stage (III-2) were lower than the scope of the present invention. Five pieces of shaving leather (water content: about 55% by mass) were prepared, in the retanning treatment of stage (III-0), the retanning agents (d1) chromium and (d2) glutaraldehyde were each added in an amount of 6.3 parts by mass (12.6 parts by mass in total), and Relugan RV as resin (b1) was added in an amount of 6.2 parts by mass, in the retanning and fatliquoring treatment of stage (III-1), as the retanning agent (a1), 3.5 parts by mass of Ukatan GM and 7.7 parts by mass of Basyntan FO (10.2 parts by mass in total) were added, in addition, 4.6 parts by mass of Relugan RV as the resin (b1), 6.3 parts by mass of Relugan RE as the resin (b2), and 6.3 parts by mass of Relugan DLF as the resin (b3) (17.2 parts by mass in total) were added, further, 3.0 parts by mass of Lipsol MSG were added as the fatliquoring agent (c1), and in the resin tanning and fatliquoring treatment of stage (III-2), 6.1 parts by mass of Lipsol MSG were added as the fatliquoring agent (c1), and 4.6 parts by mass of Relugan RV were added as the resin (b1). Apart from the matters described above, this example was carried out identically to Example 1 and subjected to the following characteristic evaluations.

Comparative Example 8

In this comparative example, the amounts of the respective substances added in stage (III-0), stage (III-1) and stage (III-2) were higher than the scope of the present invention. Five pieces of shaving leather (water content: about 55% by mass) were prepared, in the retanning treatment of stage (III-0), the retanning agents (d1) chromium and (d2) glutaraldehyde were each added in an amount of 11.7 parts by mass (23.4 parts by mass in total), and Relugan RV as resin (b1) was added in an amount of 11.4 parts by mass, in the retanning and fatliquoring treatment of stage (III-1), as the retanning agent (a1), 6.5 parts by mass of Ukatan GM and 14.3 parts by mass of Basyntan FO (20.8 parts by mass in total) were added, in addition, 8.6 parts by mass of Relugan RV as the resin (b1), 11.7 parts by mass of Relugan RE as the resin (b2), and 11.7 parts by mass of Relugan DLF as the resin (b3) (32.0 parts by mass in total) were added, further, 5.6 parts by mass of Lipsol MSG were added as the fatliquoring agent (c1), and in the resin tanning and fatliquoring treatment of stage (III-2), 11.3 parts by mass of Lipsol MSG were added as the fatliquoring agent (c1), and 8.6 parts by mass of Relugan RV were added as the resin (b1). Apart from the matters described above, this example was carried out identically to Example 1 and subjected to the following characteristic evaluations.

Comparative Example 9

In this comparative example, neither of the retanning agents (d1) chromium or (d2) glutaraldehyde was added in stage (III-0). Five pieces of shaving leather (water content: about 55% by mass) were prepared, in the retanning treatment of stage (III-0), neither of the retanning agents (d1) chromium or (d2) glutaraldehyde was added, and 8.8 parts by mass of Relugan RV were added as the resin (b1). Apart from the matters described above, this example was carried out identically to Example 1 and subjected to the following characteristic evaluations.

Comparative Example 10

In this comparative example, only the retanning agent (d1) chromium was added, and (d2) glutaraldehyde was not added, in stage (III-0). Five pieces of shaving leather (water content: about 55% by mass) were prepared, in the retanning treatment of stage (III-0), as the retanning agent, 9.0 parts by mass of only (d1) chromium were added, and 8.8 parts by mass of Relugan RV were added as the resin (b1). Apart from the matters described above, this example was carried out identically to Example 1 and subjected to the following characteristic evaluations.

Comparative Example 11

In this comparative example, only the retanning agent (d2) glutaraldehyde was added, and (d1) chromium was not added, in stage (III-0). Five pieces of shaving leather (water content: about 55% by mass) were prepared, in the retanning treatment of stage (III-0), as the retanning agent, 9.0 parts by mass of only (d2) glutaraldehyde were added, and 8.8 parts by mass of Relugan RV were added as the resin (b1). Apart from the matters described above, this example was carried out identically to Example 1 and subjected to the following characteristic evaluations.

The following Table 1 shows the amounts (parts by mass) of the respective substances used in Examples 1 to 4 and Comparative Examples 1 to 11 in each stage.

TABLE 1

| Process | | | Example 1 | Example 2 | Example 3 | Example 4 | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 | Comparative Example 11 |
|---|---|---|---|---|---|---|---|---|---|---|---|---|---|---|---|---|---|
| (III) | | Substance | | | | | | | | | | | | | | | |
| (III-0) | (d) | Retanning agent | 18.0 | 18.0 | 15.3 | 20.7 | 18.0 | 18.0 | 18.0 | — | 18.0 | 18.0 | 12.6 | 23.4 | — | 18.0 | 18.0 |
| | (d1) | Chromium | 9.0 | 9.0 | 7.7 | 10.4 | 9.0 | 9.0 | 9.0 | — | 9.0 | 9.0 | 6.3 | 11.7 | — | 9.0 | — |
| | (d2) | Glutaraldehyde | 9.0 | 9.0 | 7.7 | 10.4 | 9.0 | 9.0 | 9.0 | — | 9.0 | 9.0 | 6.3 | 11.7 | — | — | 9.0 |
| | (b) | Resin | 8.8 | 8.8 | 7.5 | 10.1 | 8.8 | 5.5 | 8.8 | — | — | 5.5 | 6.2 | 11.4 | 8.8 | 8.8 | 8.8 |
| | (b1) | Relugan RV | 8.8 | 8.8 | 7.5 | 10.1 | 8.8 | 5.5 | 8.8 | — | — | 5.5 | 6.2 | 11.4 | 8.8 | 8.8 | 8.8 |
| (III-1) | (a) | Retanning agent | 16.0 | 16.0 | 13.6 | 18.5 | 16.0 | 16.0 | 16.0 | 16.0 | 16.0 | 16.0 | 10.2 | 20.8 | 16.0 | 16.0 | 16.0 |
| | (a1) | Ukatan GM | 5.0 | 5.0 | 4.3 | 5.8 | 5.0 | 5.0 | 5.0 | 5.0 | 5.0 | 5.0 | 3.5 | 6.5 | 5.0 | 5.0 | 5.0 |
| | (a1) | Basyntan FO | 11.0 | 11.0 | 9.4 | 12.8 | 11.0 | 11.0 | 11.0 | 11.0 | 11.0 | 11.0 | 7.7 | 14.3 | 11.0 | 11.0 | 11.0 |
| | (b) | Resin | 24.6 | 24.6 | 20.9 | 28.4 | 24.6 | 15.4 | 24.6 | 40.0 | 40.0 | 15.4 | 17.2 | 32.0 | 24.6 | 24.6 | 24.6 |
| | (b1) | Relugan RV | 6.6 | 6.6 | 5.6 | 7.7 | 6.6 | 4.2 | 6.6 | 22.0 | 22.0 | 4.2 | 4.6 | 8.6 | 6.6 | 6.6 | 6.6 |
| | (b2) | Relugan RE | 9.0 | 9.0 | 7.7 | 10.4 | 9.0 | 5.6 | 9.0 | 9.0 | 9.0 | 5.6 | 6.3 | 11.7 | 9.0 | 9.0 | 9.0 |
| | (b3) | Relugan DLF | 9.0 | 9.0 | 7.7 | 10.4 | 9.0 | 5.6 | 9.0 | 9.0 | 9.0 | 5.6 | 6.3 | 11.7 | 9.0 | 9.0 | 9.0 |
| | (c) | Fatliquoring agent | 4.3 | 4.3 | 3.7 | 5.0 | 4.3 | 4.3 | 1.7 | — | — | 4.3 | 3.0 | 5.6 | 4.3 | 4.3 | 4.3 |
| | (c1) | Lipsol MSG | 4.3 | — | 3.7 | 5.0 | 4.3 | 4.3 | 1.7 | — | — | 4.3 | 3.0 | 5.6 | 4.3 | 4.3 | 4.3 |
| | (c2) | Lipsol LQ | — | 4.3 | — | — | — | — | — | — | — | — | — | — | — | — | — |
| (III-2) | (b) | Resin | 6.6 | 6.6 | 5.6 | 7.7 | 6.6 | 4.1 | 6.6 | — | — | 3.5 | 4.6 | 8.6 | 6.6 | 6.6 | 6.6 |
| | (b1) | Relugan RV | 6.6 | 6.6 | 5.6 | 7.7 | 6.6 | 4.1 | 6.6 | — | — | 3.5 | 4.6 | 8.6 | 6.6 | 6.6 | 6.6 |
| | (c) | Fatliquoring agent | 8.7 | 8.7 | 7.4 | 10.0 | 8.7 | 8.7 | 3.3 | 13.0 | 13.0 | 8.7 | 6.1 | 11.3 | 8.7 | 8.7 | 8.7 |
| | (c1) | Lipsol MSG | 8.7 | — | 7.4 | 10.0 | 8.7 | 8.7 | 3.3 | 13.0 | 13.0 | 8.7 | 6.1 | 11.3 | 8.7 | 8.7 | 8.7 |
| | (c2) | Lipsol LQ | — | 8.7 | — | — | — | — | — | — | — | — | — | — | — | — | — |
| (IV) | | Conditions | | | | | | | | | | | | | | | |
| (IV-1) | | Reduced-pressure temperature (° C.) | 40 | 40 | 40 | 40 | — | 40 | 40 | 40 | 40 | 40 | 40 | 40 | 40 | 40 | 40 |
| | | Time (min) | 2 | 2 | 2 | 2 | — | 2 | 2 | 2 | 2 | 2 | 2 | 2 | 2 | 2 | 2 |
| (IV-2) | | Atmospheric-pressure temperature (° C.) | 40 | 40 | 40 | 40 | 40 | 40 | 40 | 40 | 40 | 40 | 40 | 40 | 40 | 40 | 40 |
| | | Time (min) | 30 | 30 | 30 | 30 | 50 | 30 | 30 | 30 | 30 | 30 | 30 | 30 | 30 | 30 | 30 |

In Table 1, the added amount of each substance is rounded off to the first decimal place where necessary.

Evaluation Methods

The test methods used for the evaluation of each leather produced in the Examples and Comparative Examples are as follows.

Adhesive Wrinkling Evaluation

Each leather (side leather) produced in the Examples and Comparative Examples was divided into 20 parts as shown in FIG. 1 and test samples of each portion were obtained. Here, FIG. 1 is a schematic view and does not necessarily correlate with the dimensions described below. The dimensions of each test sample were 170 mm in the length direction (head-to-tail direction; X direction) and 170 mm in the lateral direction (dorsoventral direction; Y direction). When cutting the leather, the distance adopted between respective test samples was about 150 mm in the X direction, and was about 50 mm in the Y direction. Separately, a half pipe (length 170 mm or more) was prepared by dividing a cylindrical polyvinyl chloride pipe with an inner diameter of 100 mm into two along a plane passing through the center of the circle. Next, an adhesive tape (adhesive sheet spare tape manufactured by Daiso Sangyo Co., Ltd.) was attached to the rear surface of each test sample and the rear surface put into a restrained state, and the adhesive tape side of the test sample was pressed flush against the inner surface of the above-described half pipe. In this state, the test sample was visually observed to evaluate the degree of occurrence (suppression) of wrinkling. The evaluation criteria are as follows. Grades 1 and 2 were accepted, and grades 3 onward were rejected. When, of the 20 test samples, 10 or more (a high probability of 50% or more) of the test samples were accepted (grade 1 and grade 2), the leather was ultimately accepted.

Grade 1: No wrinkling was observed on the leather surface.
Grade 2: Faint wrinkling was observed, but it was not clear.
Grade 3: Fine linear wrinkling was observed.

Grade 4: Thick linear wrinkling was observed.

Grade 5: Thick and lengthy linear wrinkling was observed.

Figure 9:
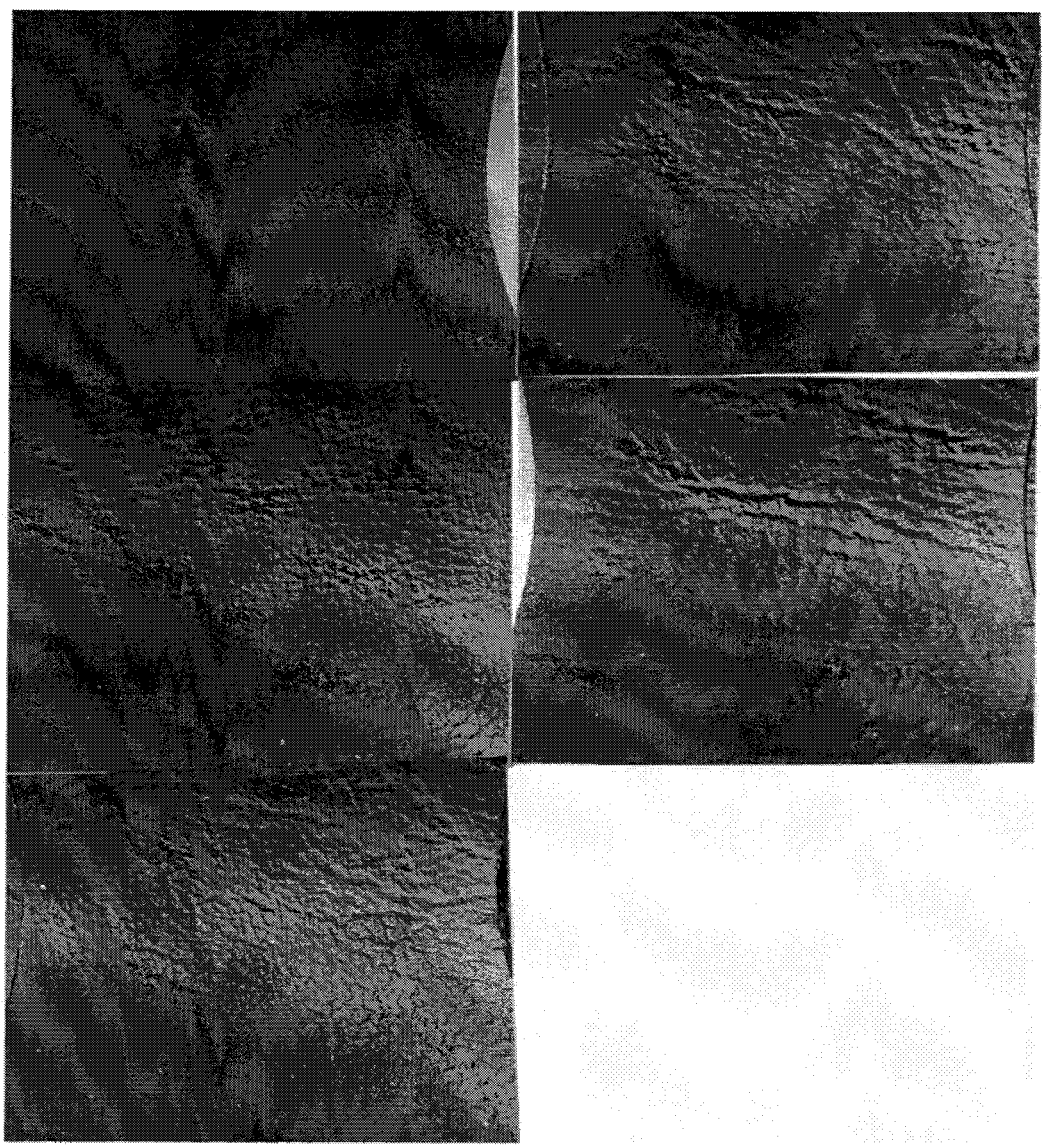
FIG. 9 is an example of a photograph showing respective criteria for grades 1 to 5 in the evaluation of adhesive wrinkling.

Further, for reference, FIG. 9 shows examples of photographs showing the respective criteria of grades 1 to 5 described above. In FIG. 9, grades 1, 2 and 3 are shown in order from the top on the left side, and grades 4 and 5 are shown in order from the top on the right side. Almost no wrinkling can be observed in the photograph of grade 1. In the photograph of grade 2, only a faint suggestion of wrinkling can be seen near the center. In the photograph of grade 3, thin linear wrinkling can be seen in the lateral direction near the center. In the photograph of grade 4, lateral wrinkling can be seen that is larger than the wrinkling seen in the photograph of grade 3. In the photograph of grade 5, thick and lengthy linear wrinkling is clearly visible near the center.

Evaluation of Boarding/Alighting Wrinkling

Figure 2:
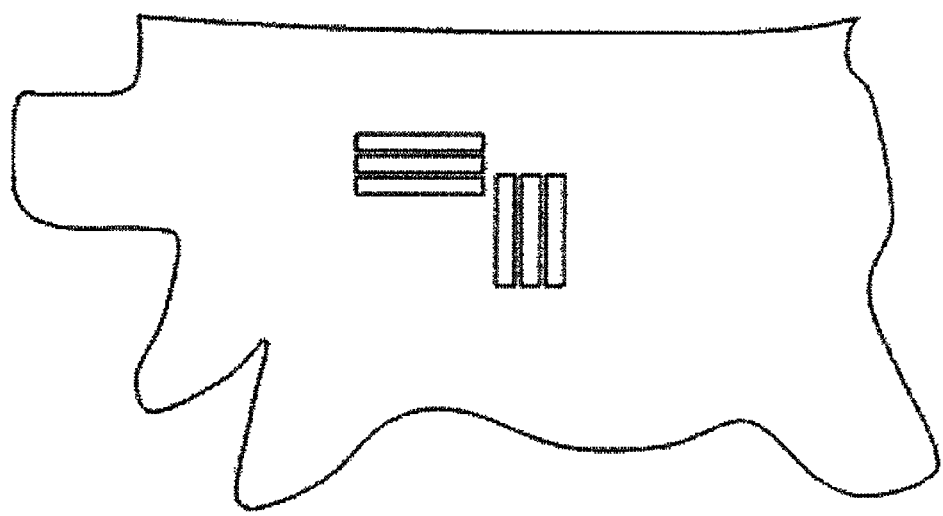
FIG. 2 is a schematic view showing cutting locations for test samples used in a crease-flex test.

For each leather (side leather) produced in the Examples and Comparative Examples, test samples were obtained by cutting from the portions shown in FIG. 2. The dimensions of each test sample were 25 mm on the short side and 120 mm on the long side. As shown in FIG. 2, the respective test samples were obtained by cutting three pieces in each of the length direction (head-to-tail direction; X direction) and the lateral direction (dorsoventral direction; Y direction). As the device, a Scott crease-flex tester (manufactured by Tester Sangyo Co., Ltd.) was used. One test sample was set in accordance with a grip width of 15 mm, a load of 9.8 N was applied, and a crease-flex test was carried out with a crease-flex cycle of 120 reciprocations/minute and a stroke of 40 mm, reciprocating 100 times (50 seconds). A total of six pieces—the three length direction test samples and the three lateral direction test samples—were subjected to the crease-flex test as described above, and the degree of occurrence (suppression) of wrinkling in each test sample was visually observed and evaluated. The evaluation criteria are as follows. Next, from each of the three test pieces in the length direction (X direction) and the lateral direction (Y direction), the average value was calculated in each of the length and lateral directions, and fractions were rounded off as the evaluation value. Grades 1 to 3 were accepted in both the length and lateral directions.

Grade 1: No wrinkling was observed on the leather surface.

Grade 2: Fine linear wrinkling was faintly observed on the leather surface.

Grade 3: Fine linear wrinkling was clearly observed on the leather surface.

Grade 4: Somewhat thick linear wrinkling was observed on the leather surface, and bulging of the wrinkles was also observed.

Grade 5: Thick wrinkling was observed on the leather surface.

Figure 10:
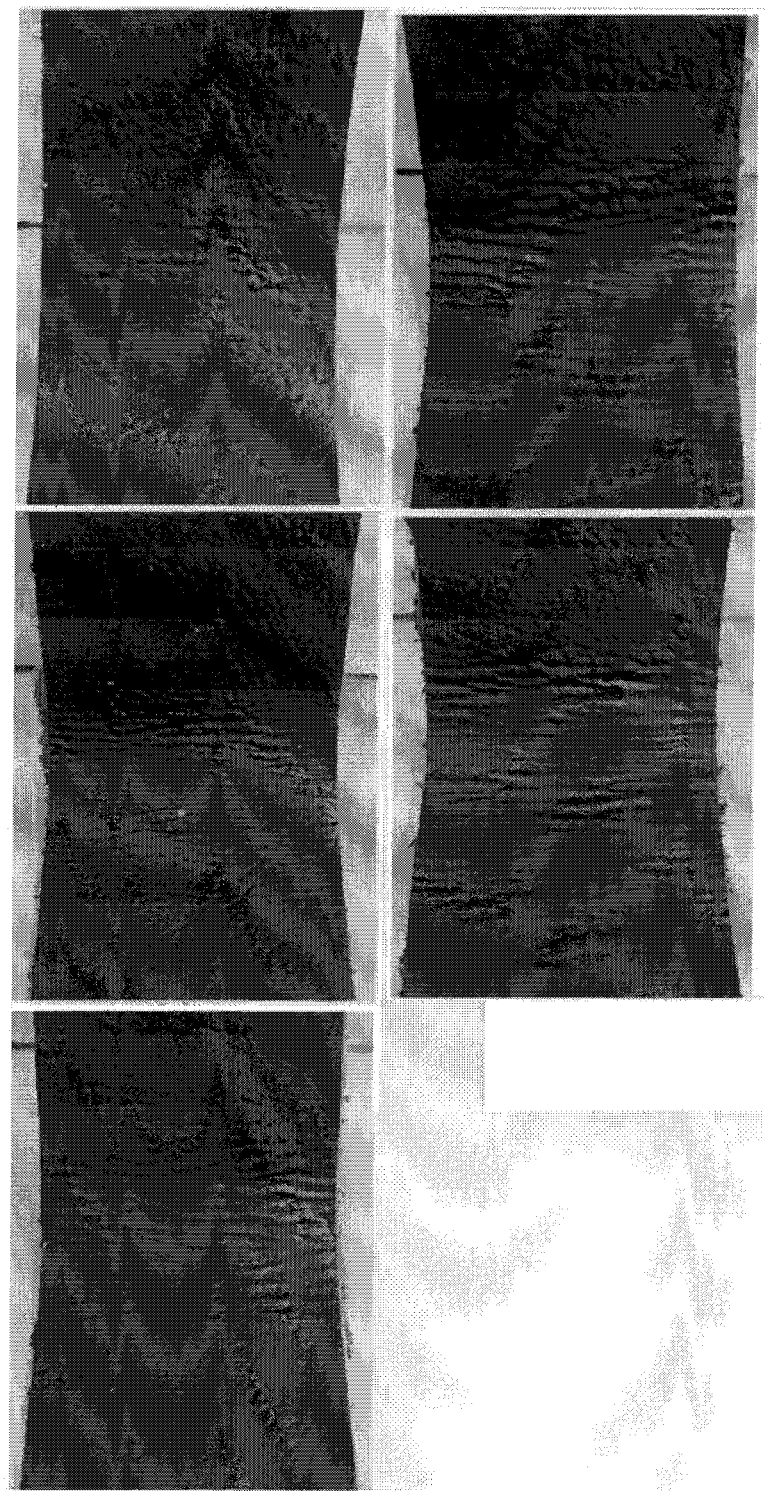
FIG. 10 is an example of a photograph showing respective criteria for grades 1 to 5 in the evaluation of boarding/alighting wrinkling.
Figure 11:
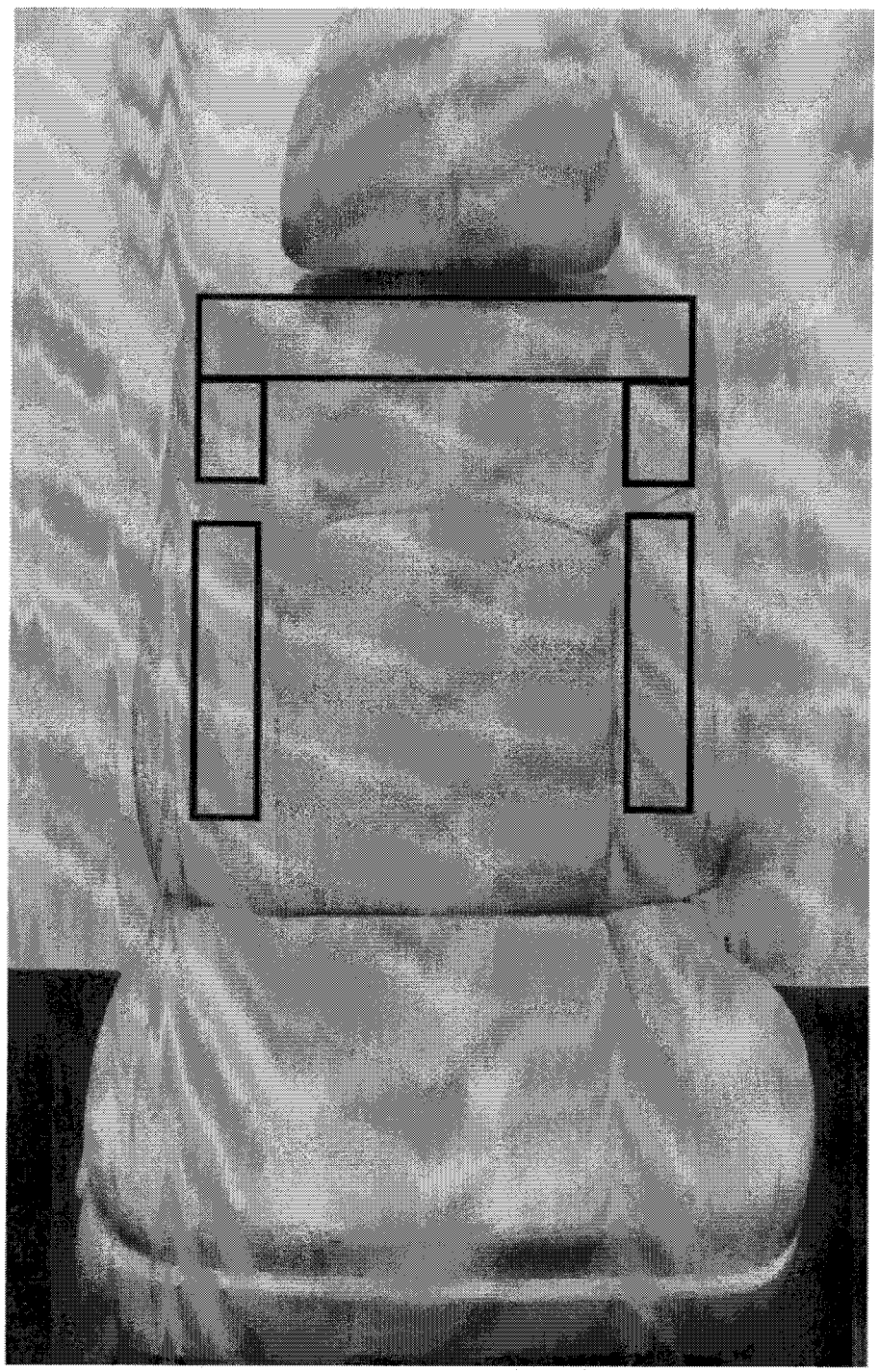
FIG. 11 is a diagram showing a curved surface of an automobile seat body; in particular, portions curved such that the front side is recessed (portions surrounded by squares).

Further, for reference, FIG. 10 shows examples of photographs showing the respective criteria of grades 1 to 5 described above. In FIG. 10, grades 1, 2 and 3 are shown in order from the top on the left side, and grades 4 and 5 are shown in order from the top on the right side. Almost no wrinkling can be observed in the photograph of grade 1. In the photograph of grade 2, only a faint suggestion of wrinkling can be seen near the center. In the photograph of grade 3, thin linear wrinkling can be seen in the lateral direction near the center. In the photograph of grade 4, lateral wrinkling can be seen that is slightly thicker and slightly more protuberant than that seen in the photograph of grade 3. In the photograph of grade 5, thick and protuberant linear wrinkling is clearly visible.

Flexibility Evaluation

The flexibility (stiffness) was evaluated by the following two tests.

(1) Push Load

Figure 3:
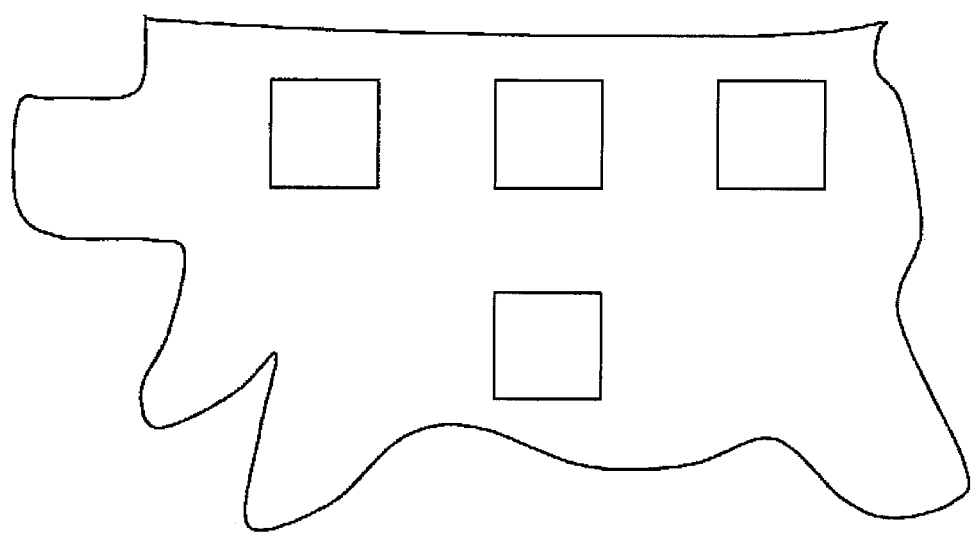
FIG. 3 is a schematic view showing cutting locations for test samples used in a push load test.
Figure 4:
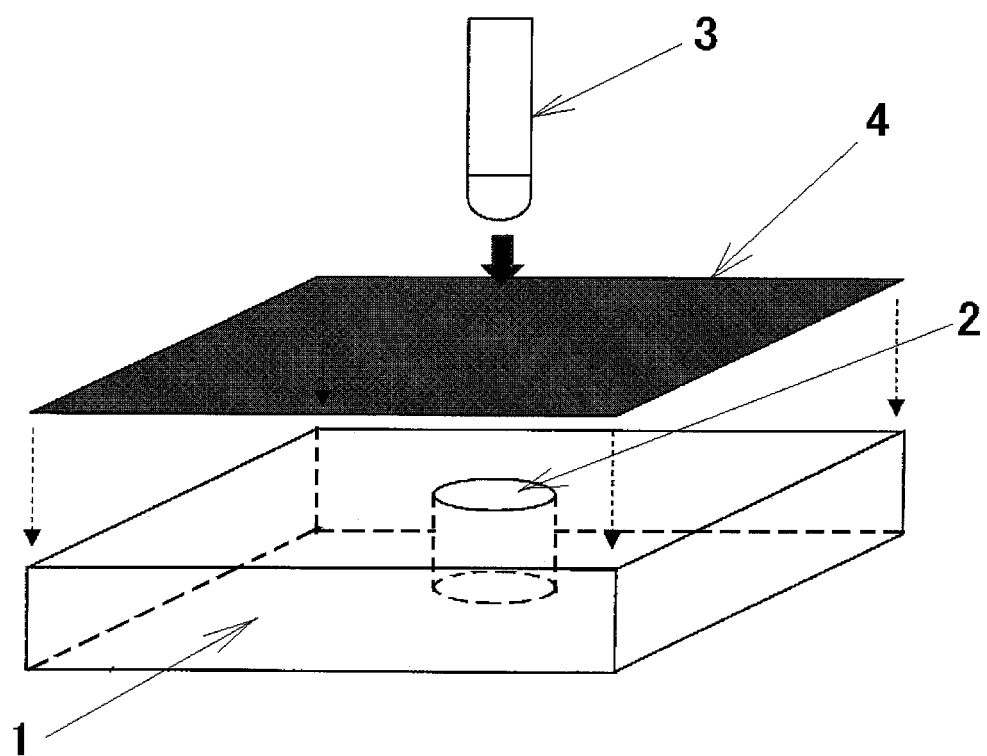
FIG. 4 is a schematic view showing a measurement device used in a push load test.

Each leather (side leather) produced in the Examples and Comparative Examples was cut from the portions shown in FIG. 3 to obtain four test samples. The dimensions of each test sample was a square with sides of 250 mm. As shown in FIG. 4, the device used for the test has sides of 250 mm and a thickness of 35 mm, and is configured from a metal flat plate (1) provided with a cylindrical through hole (2) having a diameter of 50 mm at approximately the center thereof, and a metal push-pull gauge (3) that is a cylinder having a diameter of 20 mm having, at a leading end thereof, a predetermined roundness that will not damage the leather. A test sample (4) was fixed to the upper surface of the flat plate so that it precisely overlapped, the push-pull gauge (3) was pushed down from above the test sample into the cylindrical through hole (2) in the center of the metal flat plate (1) to a depth of 27 mm, and the stress (N) at this time was measured. The stress (N) was measured for four test samples, and cases in which the average value was 12.0 N to 22.0 N were regarded as acceptable.

(2) Bending Length

Figure 5:
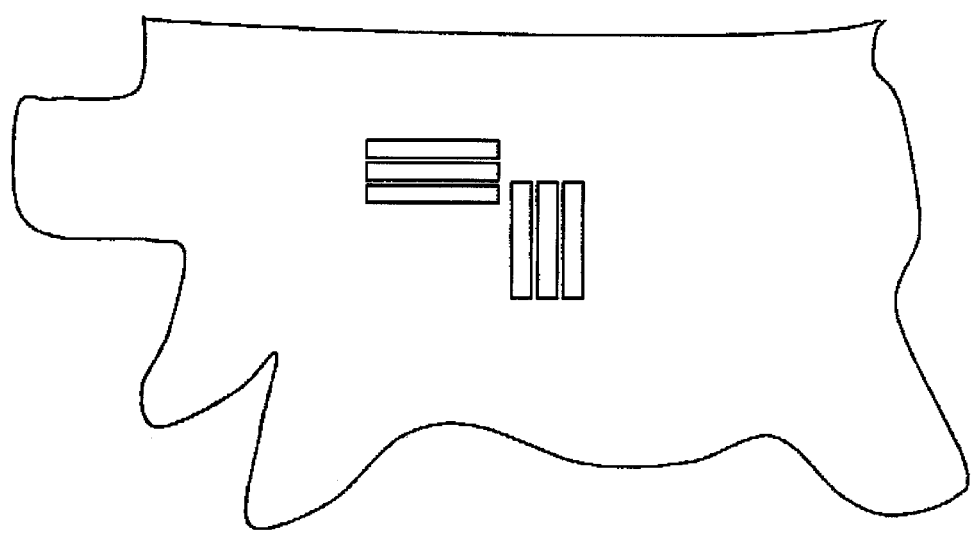
FIG. 5 is a schematic view showing cutting locations for test samples used in a bending length test.
Figure 6:
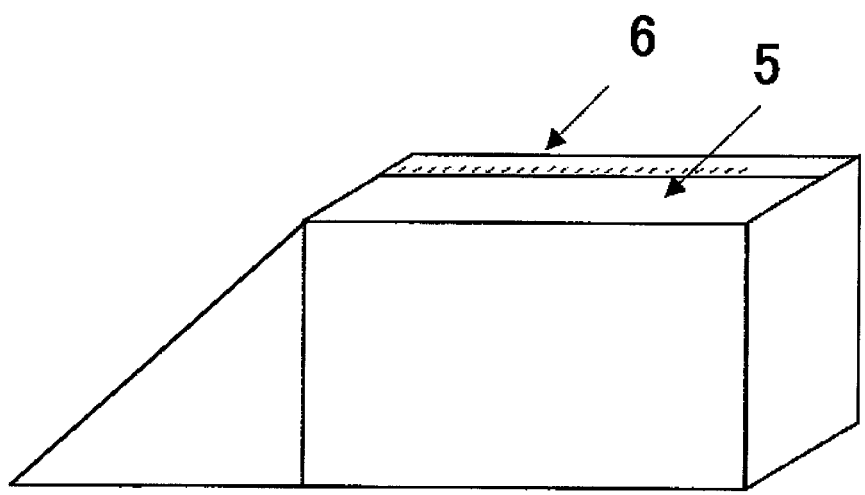
FIG. 6 is a schematic view showing a measurement device used in a bending length test.
Figure 7I:
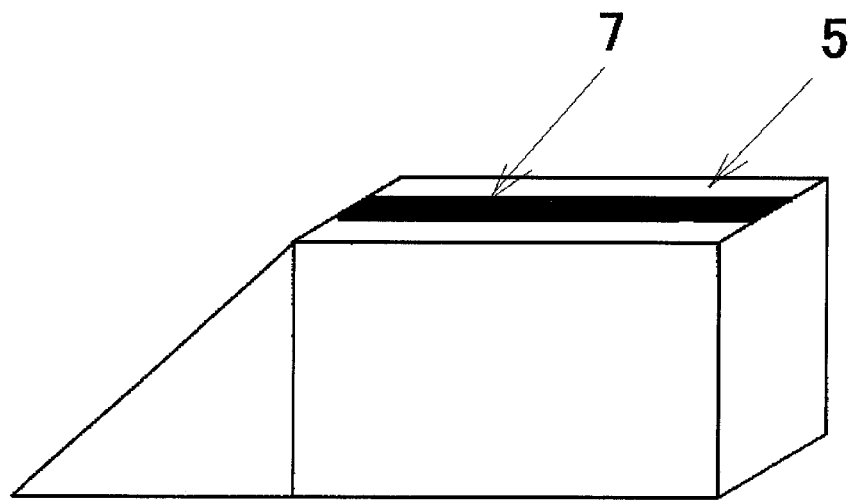
FIG. 7 is a diagram schematically showing the method of a bending length test.
Figure 7I:
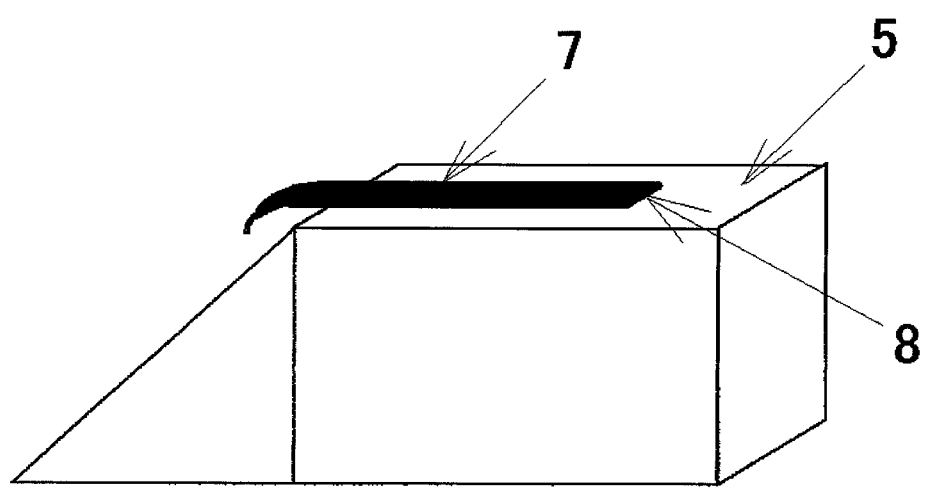

For each leather (side leather) produced in the Examples and Comparative Examples, test samples were obtained by cutting from the portions shown in FIG. 5. The dimensions of each test sample were 25 mm on the short side and 200 mm on the long side. As shown in FIG. 5, the respective test samples were obtained by cutting three pieces in each of the length direction (head-to-tail direction; X direction) and the lateral direction (dorsoventral direction; Y direction). The device used for the test is configured, as shown in FIG. 6, by a rectangular parallelepiped having a square bottom surface with sides of 50 mm and a height of 200 mm placed on its side, and a triangular prism obtained by cutting, along the diagonal, a cube having a side of 50 mm arranged at one end of the rectangular parallelepiped at an angle of 45 degrees. A ruler (6) of 200 mm is provided on the upper surface (5) of the rectangular parallelepiped parallel to the long side of the upper surface (5). As shown in FIG. 7(I), the test sample (7) is placed on the upper surface (5) of the rectangular parallelepiped such that the 200 mm long side of the test sample (7) exactly matches the 200 mm length of the upper surface (5) of the rectangular parallelepiped. Then, as shown in FIG. 7(II), the end part (8) of the test sample (7) present at the right-angled end side of the rectangular parallelepiped is slowly pushed toward the opposite end side by fingertip. The test sample (7) is pushed toward the end side of the rectangular parallelepiped cut at 45 degrees, and when it begins to bend downwards, and is pushed out further, as shown in FIG. 7(III), one end of the pushed-out portion comes into contact with the inclined surface cut at 45 degrees. At this point, pushing is stopped and the length (mm) to which the test sample (7) has been pushed out is measured. For the measurement, for one test sample, when one surface had been placed facing up, the respective two short sides of the test sample were reversed back to front and the pushed-out length was measured for these two cases, and when the other surface had been placed facing up, similarly, the respective two short sides of the test sample were reversed back to front, and the pushed-out length was measured for the two cases, and the average of the total of the four cases was taken as the bending length of the test sample. The measurement was carried out for the three test samples in each of the length direction and the lateral direction, and the average value in each of the length direction and the lateral direction was calculated. Further, cases in which the pushed-out length (mm) was 90 mm or less in both the length direction and the lateral direction were regarded as acceptable.

Leather that has passed both of the two evaluation tests described above has both appropriate rigidity and appropriate flexibility across the entire leather (front and rear surfaces) and, for example, exhibits appropriate flexibility when used as an automobile seat.

Evaluation of Elongation Uniformity

Figure 8:
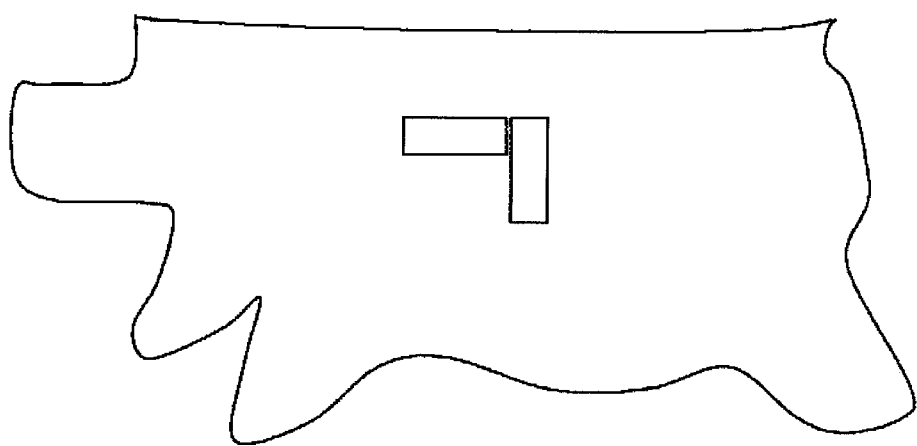
FIG. 8 is a schematic view showing cutting locations for test samples used in an elongation uniformity evaluation test.

The uniformity of the elongation of the leather was evaluated by measuring the elongation rate and the setting rate in each of the X direction and the Y direction. The elongation rate and the setting rate were measured as follows. First, as shown in FIG. 8, from the vicinity of the center of each leather (side leather) produced in the Examples and Comparative Examples, test samples were obtained by cutting in the length direction (head-to-tail direction; X direction) and the lateral direction (dorsoventral direction; Y direction). The dimensions of each test sample were 250 mm on the long side and 80 mm on the short side. Next, a straight line having a length of about 100 mm was drawn through the center point of the test sample and parallel to the long side of the test sample. The straight line was drawn so as to be divided into two by the center point of the test sample. Then, the length of the straight line was accurately measured with a caliper (the length being L). Both end parts of the test sample in the longitudinal direction were fixed with clip-shaped fasteners, one end was secured, and a load of 10 kg was applied to the other end. The state with the load applied was maintained for 10 minutes, and the length of the straight line was measured with a caliper in this state (the length being $L_1$). After the measurement, the load was released, the fasteners removed, and the test sample allowed to stand for 10 minutes, after which the length of the straight line was measured with a caliper (the length being $L_2$). The elongation rate and the setting rate were, for each one of the test samples in the length direction (X direction) and the lateral direction (Y direction), each calculated according to the following formulae. Next, the value in the lateral direction (Y direction) was subtracted from the value in the length direction (X direction) to obtain an evaluation value.

Elongation rate (%)=$(L_1-L)/L\times100$

Setting rate (%)=$(L_2-L)/L\times100$     Equation 1

The results of the above-described evaluations are shown in Table 2 below.

TABLE 2

| Evaluation | | | Example | | | | Comparative Example | | | | | | | | | | | |
|---|---|---|---|---|---|---|---|---|---|---|---|---|---|---|---|---|---|---|
| subject | | | 1 | 2 | 3 | 4 | 1 | 2 | 3 | 4 | 5 | 6 | 7 | 8 | 9 | 10 | 11 |
| Adhesive wrinkling evaluation | Adhesive wrinkling test pass rate (%) | | 65 | 65 | 55 | 50 | 40 | 45 | 75 | 50 | 55 | 40 | 25 | 25 | 40 | 45 | 45 |
| Boarding/ alighting wrinkling evaluation | Crease-flex test (grade) | Length (X) direction | 3 | 2 | 3 | 2 | 4 | 4 | 2 | 3 | 3 | 4 | 3 | 2 | 4 | 4 | 4 |
| | | Lateral (Y) direction | 2 | 3 | 3 | 2 | 4 | 3 | 2 | 3 | 3 | 3 | 3 | 3 | 4 | 3 | 3 |
| Flexibility evaluation | Push load (N) | | 19.4 | 21.8 | 19.5 | 19.0 | 21.6 | 18.0 | 25.2 | 23.3 | 22.2 | 17.4 | 19.1 | 18.4 | 19.0 | 19.6 | 19.7 |
| | Bending length (mm) | Length (X) direction | 80.0 | 81.0 | 81.0 | 80.0 | 82.0 | 77.0 | 96.0 | 92.0 | 91.0 | 80.0 | 81.3 | 79.4 | 79.0 | 82.0 | 81.0 |
| | | Lateral (Y) direction | 82.0 | 84.0 | 82.4 | 78.3 | 84.0 | 80.0 | 103.0 | 93.0 | 88.0 | 73.0 | 82.9 | 71.1 | 80.0 | 82.0 | 81.0 |
| Elongation uniformity evaluation | Difference between length (X) direction and lateral (Y) direction | Elongation rate (%) | 1.2 | 1.3 | 2.8 | 3.1 | 2.3 | 1.7 | 2.3 | 2.5 | 3.0 | 0.9 | 1.3 | 2.2 | 1.5 | 1.3 | 1.6 |
| | | Setting rate (%) | 0.7 | 0.5 | 2.0 | 1.5 | 1.8 | 1.0 | 1.0 | 1.1 | 1.0 | 0.8 | 0.7 | 0.7 | 1.0 | 0.9 | 1.1 |
| Overall evaluation | | | Pass | Pass | Pass | Pass | Fail | Fail | Fail | Fail | Fail | Fail | Fail | Fail | Fail | Fail | Fail |

Example 1 is leather produced by the method in the present invention. All of the evaluation results were acceptable, and in the obtained leather, not only was the occurrence of both adhesive wrinkling and boarding/alighting wrinkling remarkably suppressed, but the leather also exhibited appropriate flexibility. In Example 2, the fatliquoring agent used in Example 1 having a substantially ellipsoidal spherical oil droplet shape was replaced with a fatliquoring agent having a substantially spherical oil droplet shape. The push load and the bending length increased and the obtained leather was harder, but the effect of the present invention was not impaired. Here, the fact that Example 1, in which a fatliquoring agent having a substantially ellipsoidal spherical oil droplet shape was used, compared with Example 2, in which a fatliquoring agent having a substantially spherical oil droplet shape was used, has a favorable push load and bending length—that is, favorable leather flexibility—from the fact that the shape of the oil droplets is a substantially ellipsoidal sphere when fatliquoring, is thought to be because the fatliquoring agent was able to penetrate into the leather fibers more effectively. In Example 3, relative to Example 1, the amounts of each of the substances added in the respective stages (III-0), (III-1) and (III-2) of the retanning process (III) were reduced within the scope of the present invention. Although the occurrence of adhesive wrinkling increased somewhat, the effect of the present invention was not impaired. In Example 4, relative to Example 1, the amounts of each of the substances added in the respective stages (III-0), (III-1) and (III-2) of the retanning process (III) were increased within the scope of the present invention. Although the occurrence of adhesive wrinkling increased, the effect of the present invention was not impaired. Further, since the push load and the bending length of each of Examples 3 and 4 were lower than those of Example 2, it has been found that the use of a fatliquoring agent that is a substantially ellipsoidal sphere can be used to obtain leather that exhibits appropriate flexibility.

In contrast, in Comparative Example 1, the reduced-pressure drying performed in Example 1 was not carried out, and the leather was dried to a predetermined water content only by drying at atmospheric pressure. Adhesive wrinkling and boarding/alighting wrinkling of the obtained leather both significantly increased, and the leather could not be adapted to use for automobile seats, for example. In this way, it was found that the effect of the present invention cannot be obtained unless drying under reduced pressure is carried out. In Comparative Example 2, relative to Example 1, the added amount of the resin used in stages (III-0), (III-1) and (III-2) was below the scope of the present invention. Similarly to Comparative Example 1, adhesive wrinkling and boarding/alighting wrinkling of the obtained leather both significantly increased. In Comparative Example 3, the amount of the fatliquoring agent used in stage (III-1) and stage (III-2) was lower than the scope of the present invention, relative to Example 1. Although the occurrence of wrinkling was able to be significantly reduced, flexibility was significantly lowered. In Comparative Example 4, relative to Example 1, stage (III-0) was not performed, the entire amount of the resin was used in stage (III-1), and the entire amount of the fatliquoring agent was used in stage (III-2). Similarly to the inventions described in Patent Documents 1 and 2, for example, in the retanning process, first, retanning treatment using a retanning agent composed of a synthetic tanning agent and resin was performed, and after dyeing, fatliquoring treatment was performed. Although the occurrence of wrinkling in the obtained leather was able to be reduced to a certain extent, flexibility was significantly lowered. In Comparative Example 5, relative to Example 1, resin tanning was performed only in stage (III-1), and fatliquoring treatment was performed only in stage (III-2). Although the occurrence of wrinkling in the obtained leather was able to be reduced to a certain extent, flexibility was significantly lowered. Thus, from Comparative Examples 4 and 5, it was found that in cases in which the retanning treatment and the fatliquoring treatment are not performed with the resin and the fatliquoring agent appropriately separated as in Example 1, it is not possible to impart an appropriate wrinkle-suppression effect and appropriate flexibility to the obtained leather. In Comparative Example 6, relative to Example 1, the added amount of the resin used in stages (III-0), (III-1) and (III-2) was below the scope of the present invention. The results are similar to those of Comparative Example 2, and while the flexibility of the obtained leather was favorable, adhesive wrinkling and boarding/alighting wrinkling both increased significantly. In Comparative Example 7, relative to Example 1, the amounts of the respective substances added in stages (III-0), (III-1) and (III-2) were lower than the scope of the present invention. Further, in Comparative Example 8, relative to Example 1, the amounts of the respective substances added in stages (III-0), (III-1) and (III-2) were higher than the scope of the present invention. In each of these comparative examples, adhesive wrinkling increased significantly. In Comparative Example 9, relative to Example 1, in stage (III-0), the retanning agents (d1) chromium and (d2) glutaraldehyde were not added, in Comparative Example 10, relative to Example 1, only (d1) chromium was added, and in Comparative Example 11, relative to Example 1, only (d2) glutaraldehyde was added. In each case, the evaluation for adhesive wrinkling and boarding/alighting wrinkling was extremely poor.

INDUSTRIAL APPLICABILITY

According to the method of manufacturing leather in the present invention, when used for automobile seats, for example, not only is adhesion wrinkling and boarding/alighting wrinkling significantly suppressed, but leather with appropriate flexibility can be produced; therefore, the method of manufacturing leather in the present invention is expected to be widely used in the future in the production of leather for automobile seats, for example.

EXPLANATION OF REFERENCE NUMERALS

1 Metal flat plate of push load measuring device
2 Cylindrical through hole of push load measuring device
3 Push-pull gauge of push load measuring device
4 Test sample for push load measurement
5 Upper surface of rectangular parallelepiped of bending length device
6 Ruler provided on upper surface of rectangular parallelepiped of bending length device.
7 Test sample for bending length measurement
8 End part of test sample present at right-angled end side of rectangular parallelepiped

The invention claimed is:
1. A method of manufacturing leather, the method comprising, in the following order:
   (I) a pretreatment process;
   (II) a tanning process;
   (III) a retanning process; and
   (IV) a drying and finishing process, wherein:
   (III) the retanning process comprises, in the following order, subjecting a shaving leather obtained from (II) the tanning process to:
      (III-0) performing a retanning treatment using:
         from 14.4 to 21.6 parts by mass of a retanning agent (d) consisting of chromium (d1) and glutaraldehyde (d2), and
         from 7.0 to 10.6 parts by mass of at least one resin (b) selected from the group consisting of:
            (b1) a polymer consisting of one selected from the group consisting of acrylic acid, methacrylic acid, acrylic acid ester and methacrylic acid ester, or a mixture of these polymers,
            (b2) a polymer consisting of two or more selected from the group consisting of acrylic acid, methacrylic acid, acrylic acid ester and methacrylic acid ester, or a mixture of these polymers, and
            (b3) a polycondensate of melamine and formaldehyde,
      (III-1) performing a retanning treatment using from 12.8 to 19.2 parts by mass of a retanning agent (a) consisting of a polycondensate (a1) of aromatic sulfonic acid and formaldehyde, and from 19.7 to 29.5 parts by mass of the resin (b) and, at the same time, performing a fatliquoring treatment using from 3.4 to 5.2 parts by mass of a fatliquoring agent (c) consisting of (c1) a synthetic oil, a natural oil or any combination thereof, and
      (III-2) performing a resin tanning treatment using from 5.3 to 7.9 parts by mass of the resin (b) and, at the same time, performing a fatliquoring treatment using from 7.0 to 10.4 parts by mass of the fatliquoring agent (c),
   wherein an amount of each of the retanning agent (a), the resin (b), the fatliquoring agent (c), and the retanning agent (d), is an amount relative to 100 parts by mass in dry standard of a shaving leather, and the drying in (IV) the drying and finishing process comprises, in the following order, subjecting a leather obtained from (III) the retanning process to:

(IV-1) drying at reduced pressure at from 35° C. to 45° C. for from 1 to 5 minutes, and (IV-2) drying at atmospheric pressure at from 35° C. to 45° C. for from 10 to 40 minutes.

2. The method of manufacturing leather recited in claim 1, wherein (c1) the synthetic oil, natural oil or combination thereof configuring the fatliquoring agent (c) is present as an O/W type emulsion, and a shape of an oil droplet of the fatliquoring agent (c) is a substantially ellipsoidal sphere.

3. The method of manufacturing leather recited in claim 1, wherein:

in (III-0), the amount of the retanning agent (d) is from 16.0 to 20.0 parts by mass, and the amount of the resin (b) is from 8.0 to 9.5 parts by mass, in (III-1), the amount of the retanning agent (a) is from 14.5 to 17.5 parts by mass, the amount of the resin (b) is from 22.0 to 27.0 parts by mass, and the amount of the fatliquoring agent (c) is from 4.0 to 4.7 parts by mass, and in (III-2), the amount of the resin (b) is from 6.0 to 7.2 parts by mass, and the amount of the fatliquoring agent (c) is from 8.0 to 9.5 parts by mass.

4. The method of manufacturing leather recited in claim 1, wherein:

the resin (b) used in (III-0) comprises (b1) the polymer consisting of one selected from the group consisting of acrylic acid, methacrylic acid, acrylic acid ester and methacrylic acid ester, or a mixture of these polymers, the resin (b) used in (III-1) comprises (b1) the polymer consisting of one selected from the group consisting of acrylic acid, methacrylic acid, acrylic acid ester and methacrylic acid ester, or a mixture of these polymers, (b2) the polymer consisting of two or more selected from the group consisting of acrylic acid, methacrylic acid, acrylic acid ester and methacrylic acid ester, or a mixture of these polymers, and (b3) the polycondensate of melamine and formaldehyde, and the resin (b) used in (III-2) comprises (b1) the polymer consisting of one selected from the group consisting of acrylic acid, methacrylic acid, acrylic acid ester and methacrylic acid ester, or a mixture of these polymers.

5. The method of manufacturing leather recited in claim 1, the method being a method of manufacturing leather for an automobile seat.

6. The method of manufacturing leather recited in claim 2, wherein:

in (III-0), the amount of the retanning agent (d) is from 16.0 to 20.0 parts by mass, and the amount of the resin (b) is from 8.0 to 9.5 parts by mass, in (III-1), the amount of the retanning agent (a) is from 14.5 to 17.5 parts by mass, the amount of the resin (b) is from 22.0 to 27.0 parts by mass, and the amount of the fatliquoring agent (c) is from 4.0 to 4.7 parts by mass, and in (III-2), the amount of the resin (b) is from 6.0 to 7.2 parts by mass, and the amount of the fatliquoring agent (c) is from 8.0 to 9.5 parts by mass.

7. The method of manufacturing leather recited in claim 2, wherein:

the resin (b) used in (III-0) comprises (b1) the polymer consisting of one selected from the group consisting of acrylic acid, methacrylic acid, acrylic acid ester and methacrylic acid ester, or a mixture of these polymers, the resin (b) used in (III-1) comprises (b1) the polymer consisting of one selected from the group consisting of acrylic acid, methacrylic acid, acrylic acid ester and methacrylic acid ester, or a mixture of these polymers, (b2) the polymer consisting of two or more selected from the group consisting of acrylic acid, methacrylic acid, acrylic acid ester and methacrylic acid ester, or a mixture of these polymers, and (b3) the polycondensate of melamine and formaldehyde, and the resin (b) used in (III-2) comprises (b1) the polymer consisting of one selected from the group consisting of acrylic acid, methacrylic acid, acrylic acid ester and methacrylic acid ester, or a mixture of these polymers.

8. The method of manufacturing leather recited in claim 3, wherein:

the resin (b) used in (III-0) comprises (b1) the polymer consisting of one selected from the group consisting of acrylic acid, methacrylic acid, acrylic acid ester and methacrylic acid ester, or a mixture of these polymers, the resin (b) used in (III-1) comprises (b1) the polymer consisting of one selected from the group consisting of acrylic acid, methacrylic acid, acrylic acid ester and methacrylic acid ester, or a mixture of these polymers, (b2) the polymer consisting of two or more selected from the group consisting of acrylic acid, methacrylic acid, acrylic acid ester and methacrylic acid ester, or a mixture of these polymers, and (b3) the polycondensate of melamine and formaldehyde, and the resin (b) used in (III-2) comprises (b1) the polymer consisting of one selected from the group consisting of acrylic acid, methacrylic acid, acrylic acid ester and methacrylic acid ester, or a mixture of these polymers.

9. The method of manufacturing leather recited in claim 2, the method being a method of manufacturing leather for an automobile seat.

10. The method of manufacturing leather recited in claim 3, the method being a method of manufacturing leather for an automobile seat.

11. The method of manufacturing leather recited in claim 4, the method being a method of manufacturing leather for an automobile seat.

12. The method of manufacturing leather recited in claim 6, wherein:

the resin (b) used in (III-0) comprises (b1) the polymer consisting of one selected from the group consisting of acrylic acid, methacrylic acid, acrylic acid ester and methacrylic acid ester, or a mixture of these polymers, the resin (b) used in (III-1) comprises (b1) the polymer consisting of one selected from the group consisting of acrylic acid, methacrylic acid, acrylic acid ester and methacrylic acid ester, or a mixture of these polymers, (b2) the polymer consisting of two or more selected from the group consisting of acrylic acid, methacrylic acid, acrylic acid ester and methacrylic acid ester, or a mixture of these polymers, and (b3) the polycondensate of melamine and formaldehyde, and the resin (b) used in (III-2) comprises (b1) the polymer consisting of one selected from the group consisting of acrylic acid, methacrylic acid, acrylic acid ester and methacrylic acid ester, or a mixture of these polymers.

13. The method of manufacturing leather recited in claim 6, the method being a method of manufacturing leather for an automobile seat.

14. The method of manufacturing leather recited in claim 7, the method being a method of manufacturing leather for an automobile seat.

15. The method of manufacturing leather recited in claim 8, the method being a method of manufacturing leather for an automobile seat.

16. The method of manufacturing leather recited in claim 12, the method being a method of manufacturing leather for an automobile seat.

* * * * *